US007607582B2

(12) United States Patent
Vallabh et al.

(10) Patent No.: US 7,607,582 B2
(45) Date of Patent: Oct. 27, 2009

(54) AGGREGATION AND SYNCHRONIZATION OF NEARBY MEDIA

(75) Inventors: Jitesh Vallabh, Seattle, WA (US);
Kamesh C. Tumsi Dayakar, Redmond, VA (US); Richard J. Swaney, Sammamish, WA (US); Vikram Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/111,964

(22) Filed: Apr. 22, 2005

(65) Prior Publication Data

US 2006/0242259 A1    Oct. 26, 2006

(51) Int. Cl.
*G06K 7/10* (2006.01)
(52) U.S. Cl. .................................. 235/472.01; 235/487
(58) Field of Classification Search ............ 235/472.01, 235/487, 472.02, 472.03, 462.45, 462.13, 235/375
See application file for complete search history.

(56) References Cited

U.S. PATENT DOCUMENTS

2002/0085588 A1* 7/2002 Giaccherini et al. ......... 370/487
2006/0041829 A1* 2/2006 White ..................... 715/500.1

OTHER PUBLICATIONS

International Search Report and Written Opinion mailed Jul. 3, 2008 from corresponding International Application No. PCT/US06/15576.

* cited by examiner

*Primary Examiner*—Karl D. Frech
(74) *Attorney, Agent, or Firm*—Wolf, Greenfield & Sacks, P.C.

(57) ABSTRACT

Systems, methods, and computer-readable media make media content (e.g., audio, video, or pictorial data) from multiple sources available through a single interface of a client device. The client device may be a portable media playing device (such as a laptop, Tablet PC, MP3 player, portable video player, or the like). By aggregating media content from plural sources (such as a desktop PC, a set top box, etc.) and providing a unified listing of the available media content from these multiple sources on the client device, a user can view all available media content at a single location, without making multiple connections to multiple different sources. Additionally, the user can pull media content from these multiple sources to the client device. Features also are provided to automatically synchronize, obtain, and update media content on the media source(s) and/or the client device. Various ways of handling digital rights management issues associated with copying at least some media content also are described.

23 Claims, 13 Drawing Sheets

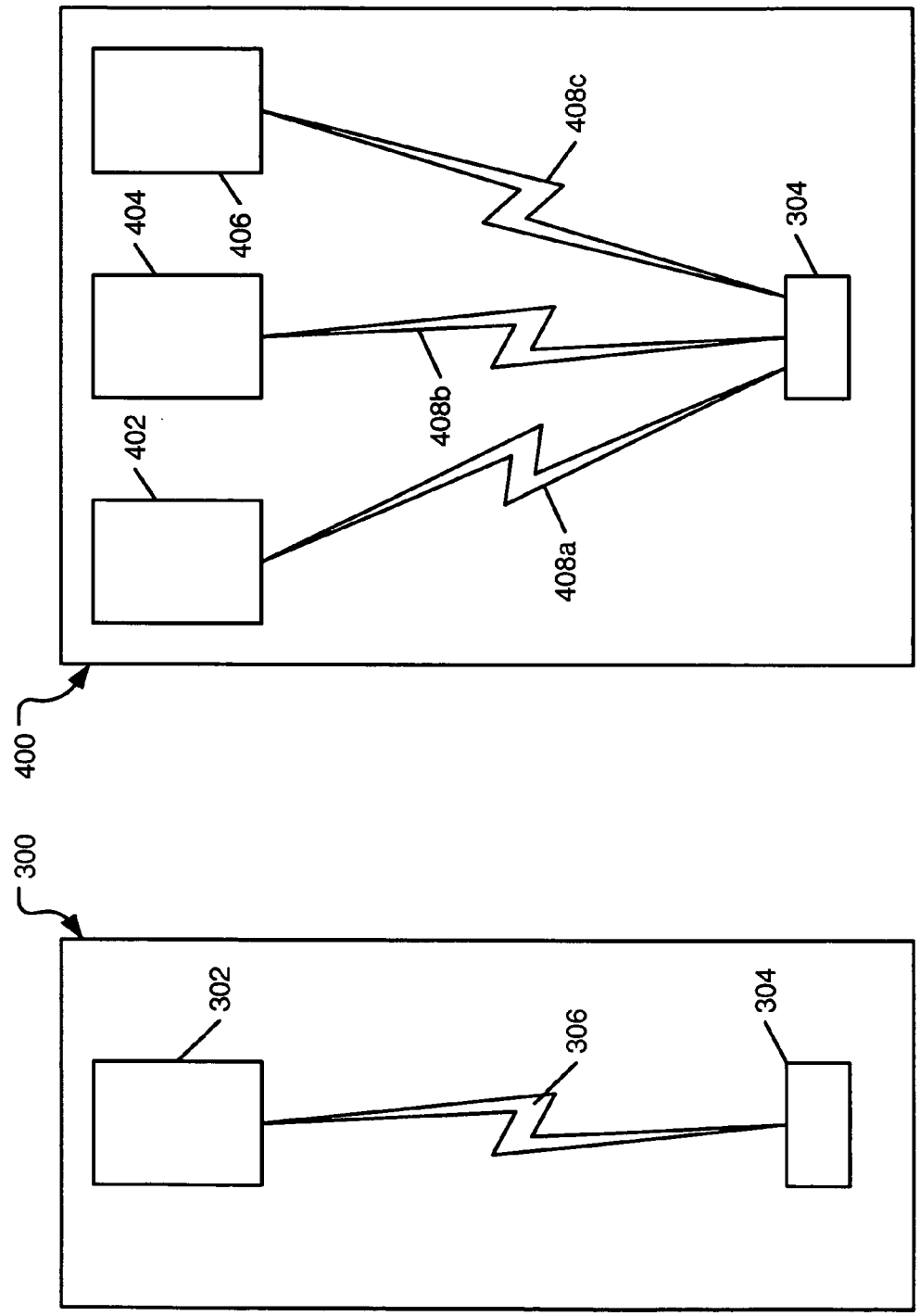

AGGREGATION AND SYNCHRONIZATION OF NEARBY MEDIA

FIELD OF THE INVENTION

The present invention generally relates to systems, methods, and computer-readable media with computer-executable instructions stored thereon for aggregating information regarding media content located on multiple sources (such as one or more desktop PCs, set top boxes, servers, etc.) and providing a unified listing of the available media content from these multiple sources to a user via a client device. In this manner, a user can conveniently view all available media content located on multiple sources (e.g., on his or her home network), at a single location (e.g., the client device), without making multiple connections of the client device to multiple different sources, and he/she also can conveniently pull desired media content from these multiple sources to the client device. Additional aspects of the invention also relate to automatically synchronizing, obtaining, and updating media content on the media source(s) and/or the client device. Still additional aspects of the invention relate to various ways of handling digital rights management issues associated with copying at least some media content.

BACKGROUND

The use and availability of media content (such as audio, video, and pictorial data) is growing rapidly with the increasing popularity of digital media coupled with the relatively low cost of personal computer hardware, other media playing devices, and/or other media services. The advent of "media" centric PCs and software for such devices, such as Windows XP Media Center Edition (available from Microsoft Corporation of Redmond, Wash.) has further fueled this growth. Therefore, it now is quite common for users to have large amounts of media content stored digitally on their PCs and/or spread around over multiple media content sources (e.g., multiple devices in the home, office, etc.). Stored media content typically is played on the primary host PC or computer, streamed to playback devices on a local network, "pushed"/copied from the primary PC or other source to a dedicated media device (such as an MP3 player, a Portable Media Center device, or the like), and/or "pushed"/copied to a media-capable mobile PC (such as a laptop, notebook, or tablet PC).

The popularity of portable media devices provides a clear indication that many users want to carry their media library (or at least a subset of it) with them in a portable manner. For various reasons, as noted above, the primary mechanism available for moving media content onto portable media devices, like those described above, is via the "push" model, which works in a 1 to 1 relationship between the host or source with the desired media content (e.g., a "media library") and each portable device onto which media content is pushed.

While the above arrangements can move media content to portable devices, there are some disadvantages to these procedures. For example, in order to "push" the media content to the portable device, users typically have to connect the portable device to the media content source, and the copying actions have to be initiated and performed via the media content source. This can be inconvenient, particularly if media content from several potential media content sources is desired (e.g., from one or more PCs, set top boxes, digital audio or video play/storage systems, etc.), because the user is required to move the portable device to the separate locations of the different sources, separately connect the portable device to these sources, locate the desired media content data, and push/copy it to the portable device. Moreover, if the user is not certain which source contains the desired media content to be included on the portable device, he/she would be forced to move from source to source, separately searching each one, until the desired media content was located.

SUMMARY

Aspects of the present invention relate to systems, methods, and computer-readable media for making media content, optionally from a variety of sources, available to a user for listing, searching, and/or copying through a single interface provided on a client device. The client device may be a portable media playing device (such as a laptop, notebook, tablet PC, MP3 player, digital video playing device, digital audio playing device, digital camera, or the like). By aggregating information regarding available media content from a plurality of potential sources (such as from one or more desktop PCs, set top boxes, MP3 or other digital audio systems or libraries, digital video playing systems or libraries, and the like) and providing a unified listing of the available media content from these sources to a user on a client device, a user can conveniently list, search, and/or view all available media content from the multiple sources at a single location (i.e., on the client device), without making multiple connections and/or multiple search queries. Additionally, the user can conveniently pull selected media content from these multiple potential sources to the client device through interaction with a user interface provided on the client device. Additional aspects of the invention relate to automatically synchronizing and/or updating media content between the media source(s) and the client device and/or automatically providing new media content to the client device when a source on the system receives new media content that meets certain pre-set or pre-selected user entered parameters. Finally, additional aspects of this invention relate to system and methods that automatically deal with various digital rights management and copy license issues associated with media content having copying limitations or restrictions.

BRIEF DESCRIPTION OF THE DRAWINGS

Various objects, features, and/or advantages of the present invention will be more readily apparent and more fully understood from the following detailed description, taken in connection with the appended drawings, in which:

FIGS. 3 and 4 include block diagrams illustrating systems and/or networks in which at least some aspects of the present invention may be practiced;

DETAILED DESCRIPTION

Figure 1:
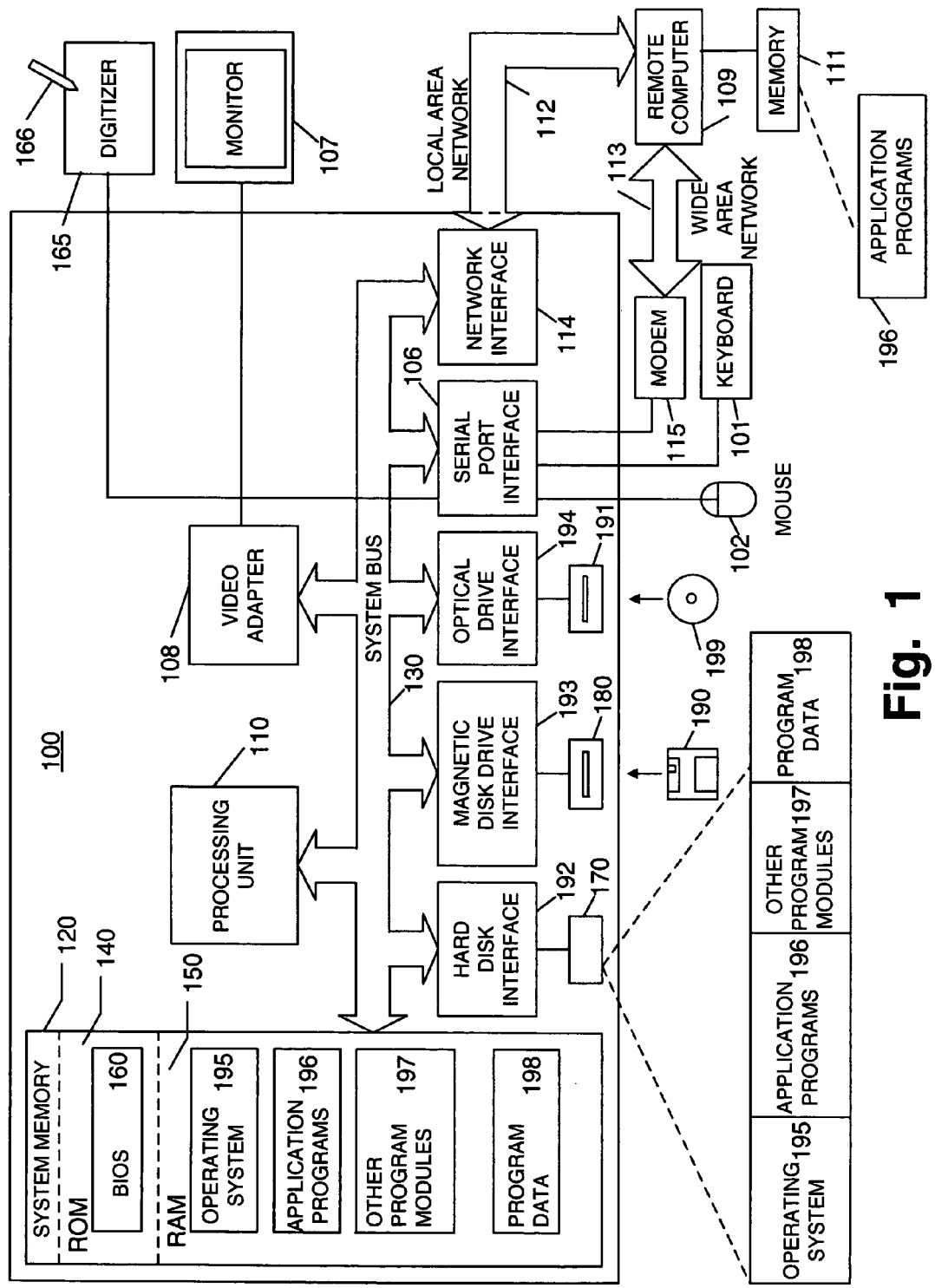
FIG. 1 illustrates a schematic diagram of a general-purpose digital computing environment, e.g., usable as a media content source and/or a client device in accordance with at least some examples of the present invention.

As described above, aspects of the present invention relate to systems, methods, and/or computer-readable media for processing, managing, and/or copying media content data, e.g., to enable easy listing, searching, browsing, and/or copying the media content data and/or information regarding available media content data to a portable client device. The following description is divided into sub-sections to assist the reader. The sub-sections include: Terms; General Description of Various Aspects of the Invention; Example Hardware; Example Systems and Methods According to the Invention; and Conclusion.

I. Terms

The following terms are used in this specification and, unless otherwise specified or clear from the context, the terms have the meanings provided below:

"Media Content"—data representing audio, video, or pictorial content, such as music or other audio data, recorded television data, DVD data, MP3 data, digital picture data, and the like. Media content data may have metadata associated with it.

"Media Content Source"—a computer or other device on which media content may be stored, received, generated, downloaded, recorded, and the like. Media content sources (also simply called "sources" herein) include, but are not limited to, laptop computers, notebook computers, tablet PCs, desktop PCs, servers, set-top boxes, digital home media centers, and the like. While not a requirement, in some instances one or more "sources" may make up and/or be included in a user's home network or system.

"Client Device"—a portable device for storing, playing, displaying, and/or otherwise processing or "consuming" media content data and/or information regarding available media content data. Examples of client devices include, but are not limited to, laptop computers, notebook computers, tablet PCs, MP3 players, portable digital video playing devices, portable digital audio playing devices, digital cameras, and the like.

"Computer-Readable Medium"—any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

As described above, the popularity of portable media playback devices, such as MP3 players, portable DVD players, and the like, provides a clear indication that users want to carry their media library (or at least a subset of it) with them in a portable manner. Mobile PCs, such as notebooks, laptops, and tablet PCs, typically surpass the technical capabilities of dedicated portable media devices (such as MP3 players, portable DVD players, and the like), and these mobile PCs serve as great media playback devices for users who want to use them as such. One of the first steps in the process of using a mobile PC (or other portable client device) as a media content playback device is to get the desired media content onto the mobile PC. While the same "push" model described above for transferring media content to portable media devices also can be used to push media content data to mobile PCs, this model does not leverage the rich resources available on the mobile PC, and it typically creates a poor user experience (e.g., all downloading actions have to be performed from the media content source(s), multiple connections are required to obtain media content from multiple machines, there generally is no ability to simultaneously list, view, and/or search for desired media content over multiple sources, etc.).

Aspects of the present invention provide a better user experience in acquiring media content for a client device, such as a mobile PC or other portable media content playback device. At least some example aspects of the present invention allow the media content acquisition processes for the client device to be driven from the client device (i.e., "pulling" the media content to the client device rather than "pushing" it from the source into the client device). In accordance with at least some examples of the invention, the full processing capabilities of the client device can be leveraged to create a rich user experience that allows the client device to "discover" media content on another "source" (e.g., via network, wireless, broadcast, or other communication and/or connection mechanisms) and "pull" the media content from the source onto the client device. When media content is available or exists on several different media content sources in at least some example systems and/or methods (e.g., on one or more PCs, set-top boxes, servers, audio systems, video systems, etc.), the client device user will be able to view an aggregated view of all the available media content on the various different sources and pull selected media content from the various sources onto the client device so that the content can be "consumed" at a later time. As more media content gets accumulated across different content sources, in accordance with at least some examples of the invention, users can keep the local media content on their client device(s) up to date, e.g., by automatically synchronizing the client device and source content and/or by updating the media content on the client device based on different, user specified or heuristic-based automated criteria.

Various aspects of the invention now will be described in more detail.

A. Pulling Selected Media Content to a Client Device

Some aspects of the present invention relate generally to systems and methods that use a client device to locate and/or pull media content from one or more media sources, e.g., on a network (such as a user's home network). Methods in accordance with at least some examples of this invention may include: (a) publishing data indicating available media content stored on or accessible via first and second media sources (e.g., published by the source(s) over a network, via a broadcast protocol, etc.); (b) receiving the data indicating the available media content at a client device; (c) displaying, on the client device, information identifying at least a portion of the available media content; and (d) pulling at least some portion of the available media content to the client device. Of course, any number of media sources may publish data that is received by the client device and/or make their media content available to the client device without departing from this invention. Methods in accordance with at least some examples of the invention further may include: generating a display on the client device indicating that media content is available; generating a request, using the client device, indicating a desire to receive the media content and/or information identifying the available media content; determining, using at least one of the first or second media sources, whether the client device is authorized to receive media content and/or information identifying the available media content from at least one of the first or second media sources; receiving user input indicating at least a first media content file from the available media content to pull to the client device; and/or determining whether the first media content file already exists on the client device. The various media sources may publish information regarding their available media content independent from one another, as a single "publication," and/or in any other desired manner.

Systems in accordance with at least some example aspects of the invention may include: (a) at least first and second media sources, wherein at least one of the sources publishes data (e.g., via a broadcast protocol, via a network connection, or in any other desired manner) indicating that available media content is stored on or accessible via at least one of the first and second media sources; and (b) a client device in electronic communication with at least one of the first and second media sources, the client device including: an input system for receiving the data indicating that media content is available, a display device for displaying information identifying at least a portion of the available media content, and a processor system for pulling at least some portion of the available media content to the client device. The client device further may include a user input system (e.g., pen, digitizer, keyboard, mouse, touch screen, etc.) for receiving user input indicating the desired media content to be pulled to the client device (if desired, the client device or other portion of the system may check to determine whether the client device already includes a copy of the requested media content before beginning the copying process).

Of course, as noted above, any number of media sources may be provided, may publish data regarding available media content that is received by the client device, and/or may make their media content available to the client device without departing from this invention. The display system of the client device further may generate a display, in response to information received from the media content sources, indicating that media content is available. When the processor system of the client device generates a message indicating a desire to receive information identifying the available media content (e.g., in response to user input) and/or a desire to receive the available media content, one or more of the sources then may determine whether the client device and/or the user is authorized to receive media content or information identifying the available media content from at least one of the media sources, and/or take other appropriate action in response to this determination. Additionally or alternatively, if desired, systems and methods in accordance with at least some examples of the invention may simply begin an authorization process when a new client device is discovered and/or when a new client device initiates a request for media content. The various media content sources may operate independent of one another, e.g., to independently publish their available media content data, send their data, etc. If desired, at least some of the various media content sources may be connected on a network, such as a LAN, and/or may be present on a plurality of independent physical networks.

Aspects of the present invention also relate to computer-readable media including computer-executable instructions stored thereon for performing various media content discovery and/or copying methods and/or for use in various media content discovery and/or copying systems, including the systems and methods described above. The computer-readable media may include computer-executable instructions stored on the various specific examples of computer-readable media described above.

B. Presenting a Unified View or Listing of Available Media Content from Multiple Media Sources Additional example aspects of the present invention relate generally to systems and methods that present a unified view or listing to a user, on a client device, of the available media content on multiple media sources. Optionally, the media sources may be connected on a network, such as a LAN. Methods in accordance with at least some examples of these aspects of this invention may include: (a) generating a display on a client device, wherein the display includes information identifying available media content stored on or accessible via at least first and second media sources; (b) receiving user input, on the client device, indicating selected media content desired for storage on the client device; and (c) pulling the selected media content corresponding to the user input to the client device (e.g., from any of the media sources). Methods in accordance with at least some examples of this invention further may include: receiving published data, at the client device (and optionally from one or more of the media sources), including information identifying the available media content stored on or accessible via one or more of the various media sources. The data may be published by one or more of the media sources, e.g., over a network, over multiple independent networks, via a broadcast protocol, and/or in any other desired manner without departing from the invention. The client device may be used to collect the information identifying the available media content from the multiple sources, compiling this information, and presenting it to the user in a unified display that includes information regarding available media content on the plural sources (optionally without displaying individual items of available media content multiple times).

Systems in accordance with at least some of these example aspects of the invention may include a portable media playing computing system (e.g., a client device). Such portable computing systems may include: (a) a display device for generating a display that includes information identifying available media content stored on or accessible via at least first and second media sources; (b) a user input system for receiving user input indicating selected media content desired for storage (e.g., on the client device); (c) a processor system for pulling the selected media content to the portable media playing system, optionally from any of the available media sources; and (d) a storage system for storing the selected media content. Systems in accordance with at least some examples of this invention further may include an input system for receiving published data (e.g., from one or more of the media sources), wherein the published data includes the information identifying the available media content stored on or accessible via the various media sources and/or information indicating that some media content is available. As noted above, the published data may be sent, for example, over a network, via a broadcast transmission, or in any other desired manner without departing from the invention.

Portable media playing systems according to at least some examples of this invention further may indicate to the user when media content is available for downloading, for example, by generating a display to advise the user when at least one of the sources contains available media content (e.g., new media content, new media content since the last time the client device checked for new content authorized for the specific client for download and playback, etc.). When media content is available, the processor system of the portable media playing system further may be programmed and adapted to generate a request indicating a desire to receive the information identifying the available media content (e.g., in response to user input, in response to various pre-selected parameters, etc.). The processor system further may be programmed and adapted to determine whether at least some of the selected media content already exists on the portable media playing system before beginning the download or copying process.

In at least some examples of systems and methods according to the invention, when the client device enters a network containing the sources and/or otherwise establishes communication with one or more of the sources, it may receive published data from one or more of the sources, and it then may generate a display indicating to the user that media content is available. If the user then generates a request indicating a desire to receive the available media content and/or information identifying the available media content (e.g., using the client device), one or more of the sources or another network device then will determine whether that user and/or that client device is authorized to receive media content or information identifying the available media content from at least one of the media sources.

Finally, additional example features of this aspect of the present invention may relate to computer-readable media including computer-executable instructions stored thereon for performing media content list presentation and/or retrieval functions and/or for use in operating various media content list presentation and/or retrieval systems, including the systems and methods described above. The computer-readable media may include computer-executable instructions stored on the various specific examples of computer-readable media described above.

C. Updating and Synchronizing Media Content on a Source and/or a Client Device

Additional example aspects of the present invention relate to various systems and methods that automatically update and synchronize the media content between the various sources and the client device. Methods in accordance with at least some examples of the invention may include: (a) placing a client device in electronic communication with at least one media source; (b) determining whether the media source includes media content that is not included on the client device; and (c) copying at least a portion of the media content not included on the client device onto the client device. Once a user and/or a client device has initially been authenticated and verified as authorized to receive media content from the media source(s), (if necessary for the specific system) the various steps described above (e.g., the electronic communication, determining, and/or the copying steps) can take place automatically, without direct user input initiating the steps in each instance (assuming, of course, that the user and/or client device remain authorized to receive the media content, if such authorization is necessary on the specific system).

Other updating and/or synchronization methods in accordance with examples of this invention may include: (a) placing a client device in electronic communication with at least one media source; (b) determining whether the client device includes media content that is not included on at least one of the media sources; and (c) copying at least a portion of the media content not included on at least one media source onto at least one media source. Also, the various steps described above (e.g., the electronic communication, determining, and/or the copying steps) can take place automatically, without direct user input initiating the steps in each instance (assuming, of course, that authorization and a sharing relationship remain between the client device and the source(s), if such authorization is necessary on the specific system).

Still additional updating and/or synchronization methods in accordance with examples of the invention may allow automatic changes or additions to the media content on a client device when media content corresponding to various pre-selected parameters is present on a source (such as when new media content is available on a source performed by a particular artist, group, or band, when new media content is available on a source including recorded television content of a specific title or a specific time slot, when new media content is available on a source relating to pre-selected subject matter, etc.). Such methods may include: (a) receiving user input (e.g., through a client device, through a media content source, from another source, etc.) indicating parameters for desired media content for inclusion on a client device; (b) placing the client device in electronic communication with at least a first media source; (c) determining whether the first media source includes media content that satisfies the user input parameters; and (d) copying at least some media content satisfying the user input parameters onto the client device. Methods according to at least some examples of this aspect of the invention further may include determining whether the media content that satisfies the user input parameters is already included on the client device. In such methods, the copying step may be conducted when the media content that satisfies the user input parameters is not already included on the client device, but the copying step need not be conducted when the media content that satisfies the user input parameters is already included on the client device. If desired, in methods according to at least some examples of this invention, at least one of the media sources will publish information, accessible by the client device, indicating that new media content satisfying the user input parameters is available for downloading to the client device. Optionally, as mentioned above, these methods may be set up such that the copying step (and optionally other steps described above) occur automatically (e.g., in a background thread), without further user input, when the client device communicates with the source(s) and it is determined that media content that satisfies the user input parameters is included on at least one of the sources.

Other updating and/or synchronization aspects in accordance with examples of this invention relate to maintaining the various media content files (e.g., keeping the media content up to date and/or synchronized) when changes to the media content files are made on one of the media source or the client device. Methods in accordance with at least some examples of these aspects of the invention may include: (a) placing a client device in electronic communication with at least one media source, wherein the media source includes a first media content file and the client device includes a corresponding first media content file; (b) determining whether media content of the first media content file on the media source differs from media content on the corresponding first media content file on the client device; and (c) when the media content of the first media content file differs from the media content of the corresponding first media content file, determining which file contains the most recent media content and synchronizing media content data included in the first media content file and the corresponding first media content file such that each file includes the most recent media content. At least some examples of this aspect of the invention further may include: storing identification data associated with the first media content file on the media source and/or storing identification data associated with the corresponding first media content file on the client device (the "identification data" may include, for example, any type of information, e.g., as metadata, that identifies the content of the data, such as last edit date, last edit time, recordation date, recordation time, download date, download time, version information, source information, and the like). In such methods, the "determining" step may include determining whether the identification data associated with the first media content file differs from the identification data associated with the corresponding first media content file. If desired, the various updating and synchronizing steps described above may be performed automatically, e.g., whenever electronic communication is established, optionally in a background thread, without the need for user input to initiate and/or proceed with the various processes.

Aspects of the invention further relate to various example systems for performing media content updating and/or synchronization methods, e.g., like the methods described above. As a first example, a system in accordance with at least some examples of this invention may include: (a) at least one media source; and (b) a client device operatively connected to (e.g., in electronic communication with) the media source. In such example systems, a computer processor system included with at least one of the media source or the client device may be programmed and adapted to: (a) determine whether the media source includes media content that is not included on the client device, and (b) copy at least a portion of the media content not included on the client device onto the client device.

Another media content updating and/or synchronization system in accordance with at least some examples of this invention may include: (a) at least one media source; and (b) a client device operatively connected to (e.g., in electronic communication with) the media source. A computer processor system included with at least one of the media source or the client device in accordance with this example system may be programmed and adapted to: (a) determine whether the client device includes media content that is not included on at least one of the media sources, and (b) copy at least a portion of the media content not included on at least one media source onto at least one media source.

Still another media content updating and/or synchronization system in accordance with at least some examples of this invention may include: (a) a media source; and (b) a client device operatively connected to (e.g., in electronic communication with) the media source. A computer processor system included with at least one of the client device or the media source in accordance with this example aspect of the invention may be programmed and adapted to: (a) receive user input indicating parameters for desired media content for inclusion on the client device, (b) determine whether the media source includes media content that satisfies the user input parameters, and (c) copy at least some media content satisfying the parameters onto the client device. The processor system further may be programmed and adapted to determine whether the media content that satisfies the user input parameters is already included on the client device, wherein the copying step is conducted when the media content that satisfies the user input parameters is not already included on the client device and the copying step is not conducted when the media content that satisfies the user input parameters is already included on the client device. In at least some examples of such systems, the media source may be adapted to output information, receivable by the client device, indicating that new media content satisfying the user input parameters is available.

Another media content updating and/or synchronization aspect in accordance with at least some examples of this invention relates to systems that automatically maintain media content files up to date and/or synchronized when changes to the media content files are made on one of the media source or the client device. Such systems may include: (a) a media source that includes a first media content file; and (b) a client device operatively connected to (e.g., in electronic communication with) the media source, wherein the client device includes a corresponding first media content file corresponding to the first media content file. A computer processor system for at least one of the client device or the media source in accordance with this example aspect of the invention may be programmed and adapted to: (a) determine whether media content of the first media content file on the media source differs from media content of the corresponding first media content file on the client device, and (b) when the media content of the first media content file differs from the media content of the corresponding first media content file, determining which file contains the most recent media content and synchronizing media content data included in the first media content file and the corresponding first media content file such that each file includes the most recent media content. The media content file and the corresponding media content file may include data identifying information relating to their respective edit, download, or content (such as last edit date, last edit time, recordation date, recordation time, download date, download time, version information, source information, and the like), and this identifying information may be compared between the two files to determine which file has the most recent, up-to-date information.

Aspects of the present invention also relate to computer-readable media including computer-executable instructions stored thereon for performing various media content file updating and/or synchronization methods and/or for use in various media content file updating and/or synchronization systems, including the systems and methods described above. The computer-readable media may include computer-executable instructions stored on the various specific examples of computer-readable media described above.

D. Digital Rights Management Aspects

Additional example aspects of the present invention relate to handling digital rights management issues (e.g., copying limitations, copyright license issues, etc.) in systems and methods for transferring media content to client devices, e.g., like the various systems and methods described above. At least some example methods in accordance with these aspects of the invention may include: (a) receiving plural media content files on a first media source; (b) determining whether digital rights management issues limit a user's ability to produce or receive copies of an individual media content file from the first media source; (c) receiving user input, through a client device, indicating selected media content files desired for storage on the client device; (d) for one or more selected media content files that have no copying limitations due to digital rights management issues, copying the selected media content file or files to the client device; and (e) for at least one selected media content file that has copying limitations due to digital rights management issues, taking at least one step toward obtaining a license or authorization to copy the selected media content file and/or otherwise dealing with the digital rights management issues.

Example systems in accordance with these aspects of the invention may include: (a) a first media source including plural media content files and a processor system programmed and adapted to determine whether digital rights management issues limit a user's ability to produce or receive copies of an individual media content file from the first media source; and (b) a client device in electronic communication with the first media source, the client device including a user input system, wherein the user input system receives user input indicating selected media content files desired for copying or storage on the client device. For one or more selected media content files that have no copying limitations due to digital rights management issues, the processor system of the first media source will allow the selected media content files to be copied to the client device. For at least one selected media content file that has copying limitations due to digital rights management issues, the processor system will take at least one step toward obtaining a license or authorization to copy the selected media content file and/or otherwise dealing with the digital rights management issues.

Various steps may be taken automatically by systems and methods in accordance with at least some examples of these aspects of the invention to proceed with the process of obtaining a license or authorization to copy the selected media content file(s) and/or otherwise deal with the digital rights management issues. For example, when media content having restricted copying authorization is selected by the user for copying, systems and methods in accordance with at least some examples of the invention may advise the user (e.g., via the display device of the client device or the media source, through a message from the media source to the client device, etc.) that a license is necessary before copying can proceed (or at another appropriate time), thereby prompting the user to obtain the license, if desired. As another example, systems and methods according to at least some examples of the invention may automatically seek to obtain the copying license, e.g., via an on-line Internet connection, and then proceed to make the copies on the client device when and if a license is obtained. As still another example, media content files may be "checked out" of the media source and "checked into" the client device, such that only a single copy of the media content file is available to the user at a given time (e.g., so that multiple copies cannot be made or available at any given time). Systems and methods in accordance with still other examples of the invention further may be adapted to limit the number of copies producible from the source, to limit the time the copy is available for use on the client device, and/or otherwise to comply with copying limitations imposed on the media content. Any other desired ways of proceeding to obtain the necessary copying license or otherwise dealing with the digital rights management issues may be used without departing from the invention.

As still another example, if desired, when media content with limited and/or no copy authorization is received on a media source, the media source could take steps to not publish or list that media content as part of the available media content and/or to make any listing of this media content unselectable by the user for copying to the client device (by showing the content in the listing and making it "unselectable," this can inform the user of the need to obtain a license, if copying of that content is desired). Of course, any way of handling limitations on copying rights may be handled without departing from aspects of this invention.

Additionally, aspects of the present invention also relate to computer-readable media including computer-executable instructions stored thereon for dealing with various digital rights management issues in systems and methods, like the various systems and methods described above. The computer-readable media may include computer-executable instructions stored on the various specific examples of computer-readable media described above.

III. Example Hardware

FIG. 1 illustrates a schematic diagram of a general-purpose digital computing environment that can be used, for example, as a media content source and/or a client device, to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide non-volatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
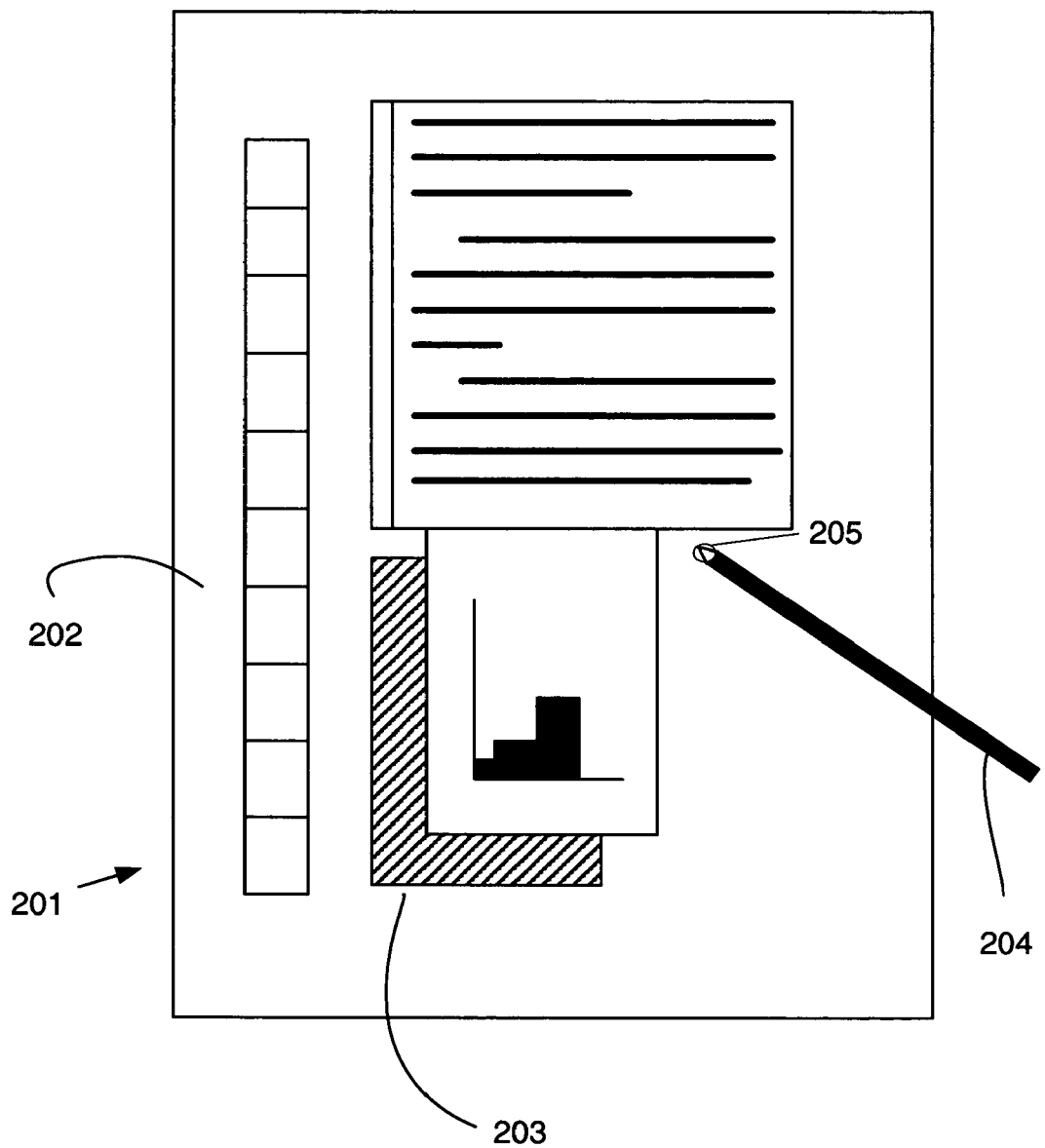
FIG. 2 illustrates a pen-based personal computing (PC) environment, e.g., usable as a media content source and/or a client device in accordance with at least some examples of the present invention.

FIG. 2 illustrates a pen-based personal computer (PC) 201 that can be used in accordance with various aspects of the present invention, for example, as a media content source and/or a client device. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as Fine-Point Innovations Co.) or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention may be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus.

The invention now will be described in conjunction with the remaining figures, which help illustrate various example features and aspects of the invention and help explain the invention. The specific figures and information contained in this detailed description should not be construed as limiting the invention.

IV. Example Systems and Methods According to the Invention

A. Pulling Selected Media Content to a Client Device, Optionally from Multiple Media Content Sources, and Presenting a Unified Listing or View of Available Media Content from Multiple Media Sources FIG. 3 illustrates an example system 300 in which media content can be discovered by and provided to a client device (e.g., by "pulling" or driving the copying operation from the client device). As shown in FIG. 3, the example system 300 includes a media content source 302 that is operatively connected to (e.g., in electronic communication with) a client device 304, as shown by connection arrow 306. Any suitable or desired type of connection 306 or communication between the source 302 and the client device 304 may be used without departing from the invention, such as a wired connection (e.g., Ethernet, telephone line, etc.), a wireless connection, a broadcast connection, or any other specific type of connection, including conventional connection types known and used in the art. In at least some examples of the invention, the media content source 302 and/or client device 304 will include at least some of: a wireless router, a wireless card, infrared transmission/reception capabilities, broadcast transmission/reception capabilities (e.g., UDP or TCP/IP capabilities, etc.) and/or other transmission/reception means to enable communication between the devices 302 and 304. In this manner, when a wireless connection system is used, when a user carrying a client device 304 enters in proximity to the system 300, the source 302 and the client device 304 can establish communication with little or no user input. The system 300 may constitute a network, such as a LAN or other local system, such as a small network located at a user's home or office.

In general, systems 300 and methods according to this example of the invention may operate as follows. The media content source 302 will publish data indicating available media content stored on or accessible via source 302 (or at least information indicating that such media content is available). The client device 304 will receive the data including the available media content and/or indicating that media content is available, and then the client device 304 will generate a display, on the client device 304, including information identifying at least a portion of the available media content on the source 302. Using the client device 304 (and a user interface provided with that device 304, which will be described in more detail below), the user can select various specific media content files to transfer or copy onto the client device 304. In response to the user's selections, the client device 304 can initiate a process in which data corresponding to the selected media content then is "pulled" over to the client device 304 via the communication system 306. Of course, any desired number of client devices 304 may be configured and/or authorized to communicate with source 302 without departing from the invention.

Any desired type, format, data, and/or other information can be published, transferred, and/or received by the source 302 and/or the client device 304 without departing from this invention. At least some examples of this invention may take advantage of technology for publishing and discovering the availability of media content that already exists. More specifically, as is known in the art, Windows Media Content Servers (e.g., available with Windows Media 10, from Microsoft Corporation of Redmond, Wash.) uses Universal Plug-and-Play technology ("UPnP") to publish metadata about media content. In at least some examples of this invention, the source 302 may function as a Windows Media Content Server or a UPnP audio/video server, for example, if the source 302 includes a Windows Media Connect ("WMC") component (e.g., part of the commercially available Windows Media Player 10 update). This Windows Media Connect component will enable the source 302, which includes the media content to be transferred, to publish information (e.g., metadata) about the media content contained on the source 302 that is available for client devices 304 to inspect and/or copy. The client device 304, on the other hand, may have corresponding UPnP client software loaded on it that enables it to access the "remote" media content from the UPnP server (i.e., source 302, in the example structure of FIG. 3).

Because mechanisms such as UPnP allow for fairly automatic inspection and discovery of metadata, the media content acquisition experience for mobile PC users can be made relatively transparent and seamless. For example, when a user with a mobile PC as a client device 304 enters a system 300, the mobile PC 304 can authenticate itself with the server (i.e., source 302, in this example) and "discover"/inspect available media content on the source 302. The client device 304 then can generate a list of available media content on the source 302 and present this list to the user on a display of the client device 304. Example authentication procedures are described in more detail later in this specification.

Systems in accordance with at least some examples of this invention are not limited to a single media content source 302, as shown in FIG. 3. FIG. 4 illustrates another example system 400 in which a single client device 304 is operatively coupled to (e.g., in electronic communication with) a plurality of media content sources 402, 404, and 406. While the client device 304 is shown having separate connections 408a, 408b, and 408c to the sources 402, 404, and 406, respectively, in FIG. 4 (e.g., by wired or wireless connections of the type described above), those skilled in the art will appreciate that the relationship and/or connections between the various sources 402, 404, and 406 (if any) may vary without departing from the invention. For example, the sources 402, 404, and 406 may be completely independent from one another, connected together in a network (such as a LAN, etc.), or otherwise in communication with one another, without departing from the invention. As another potential alternative, if desired, all or some of the media content sources 402, 404, and 406 may communicate with a common server computer (optionally one of the three sources 402, 404, and 406), and then that server computer could publish media content information and/or communicate with client device 304 on behalf of itself and/or its connected sources. Any networking or other arrangement of communication between the various sources and/or client devices may be used without departing from the invention.

The various sources 402, 404, and 406 may be the same as or different from one another without departing from the invention. For example, one source 402 might constitute a desktop PC, while another source 404 may constitute a television set-top box and still another source 406 may constitute a server or digital storage device. Also, any number of sources may be included in the system 400 without departing from the invention, and any number of client devices 304 also may be authorized to interact with the system 400 without departing from this invention. Of course, the various client devices 304 also may be the same as or different from one another without departing from the invention.

In general, the system 400 with multiple sources 402, 404, and 406 may operate in a manner similar to the manner described above in conjunction with FIG. 3. As a more specific example, in at least some examples of the invention, the various media content sources 402, 404, and 406 may independently publish data indicating available media content stored on or accessible via that individual source (or at least publish data indicating that media content is available on that source). The client device 304 will receive this published data, and it will compile the information from the various sources 402, 404, and 406 and generate a single display or list, on the client device, including information identifying at least a portion of the available media content on the multiple sources 402, 404, and 406. Optionally, if desired, the client device will list individual items of available information a single time, even if the same item is available on multiple sources 402, 404, and 406. Using client device 304 (and a user interface provided on that device 304, which will be described in more detail below), the user can select various media content files, from any of the sources 402, 404, and 406, to transfer or copy onto the client device 304. In response to the user's selections, the client device 304 can initiate a process in which data corresponding to the selected media content files then is "pulled" over to the client device 304 via the system communications 408a, 408b, and 408c.

As with the example system 300 illustrated in FIG. 3, any desired type, format, data, and/or other information can be published, transferred, and/or received by the sources 402, 404, and 406 and/or client device 304 without departing from this invention. In some more specific examples, each of the sources 402, 404, and 406 individually may function as a Windows Media Content Server or an UPnP audio/video server (e.g., by including a Windows Media Connect ("WMC") component (part of Windows Media Player 10 update)). This Windows Media Connect component can enable the sources 402, 404, and 406 to publish information (e.g., metadata) about their contained media content and make this information (as well as the underlying media content) available for client devices 304 to inspect and/or copy. The client device 304, again, may have corresponding UPnP client software loaded on it that enables it to access the "remote" media content from the UPnP servers (i.e., sources 402, 404, and 406 in the example structure of FIG. 4). Alternatively, if desired, one or more individual source 402, 404, and 406 or an independent server or computer may function as a Windows Media Content Server or an UPnP audio/video server for the other sources included in the system 400 (and the client devices 304 may then connect with this single server computer). As still another alternative, in at least some examples, the various sources (e.g., 402, 404, and 406) may be located on separate and independent networks (e.g., one wired, one wireless, etc.). Each network also may have multiple media sources, if desired, and the client device 304 may aggregate media content from sources located on different networks).

Figure 5:
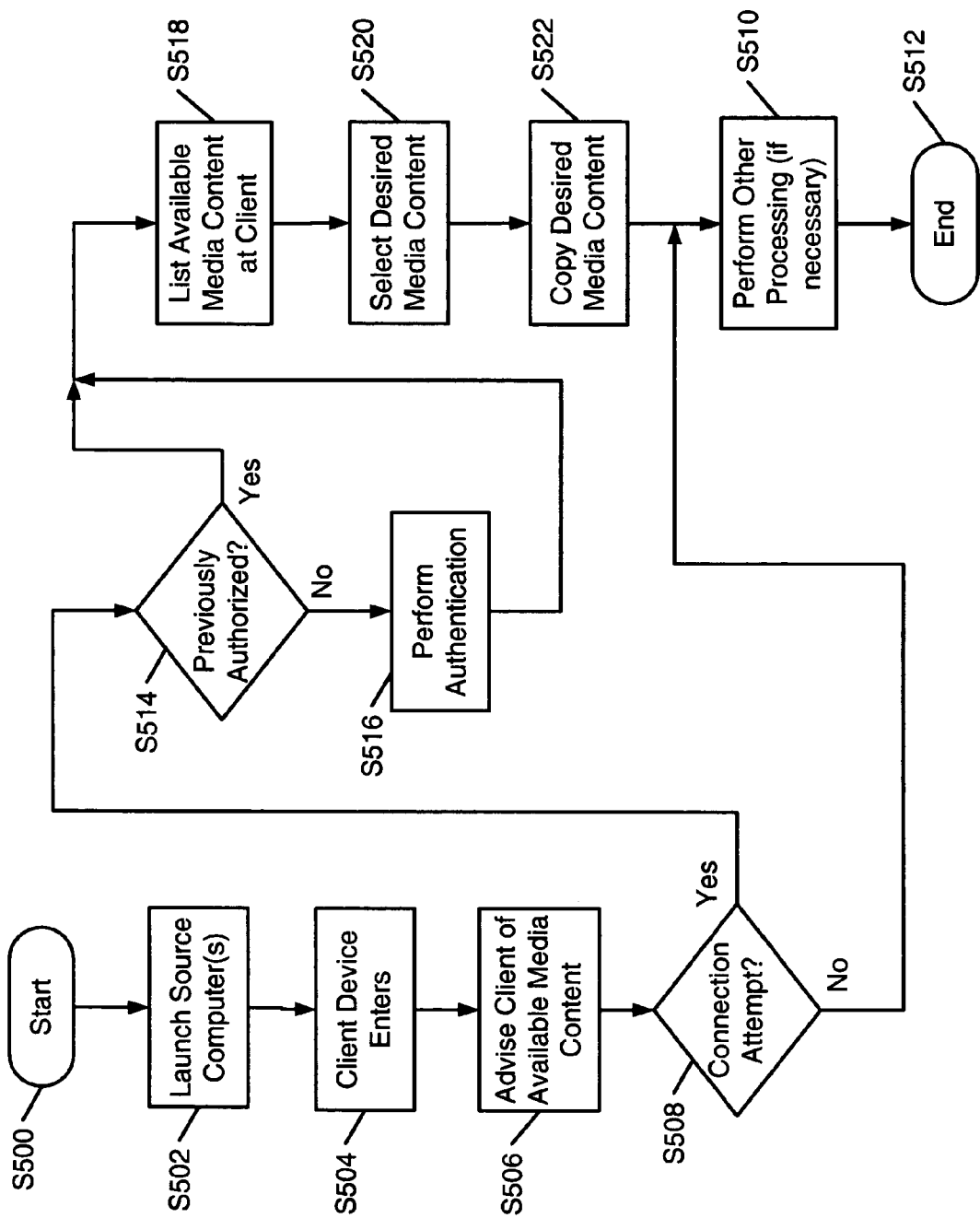
FIG. 5 includes a flow diagram illustrating operation of examples of some methods in accordance with this invention.

FIG. 5 includes a flowchart generally illustrating an example process of communication between one or more media content sources and one or more client devices in accordance with at least some examples of this invention. As the procedure starts (S500), the various media content source (s) or server(s) are launched or booted up (S502). The sources periodically and/or continuously publish information, e.g., information indicating the specific media content that is available for download, information indicating that media content is available for download, information indicating that new media content is available (e.g., since the last download, etc.), etc. This publication may be performed, for example, using a broadcast protocol (e.g., UDP, TCP/IP, etc.), in UPnP format, etc.

Figure 6:
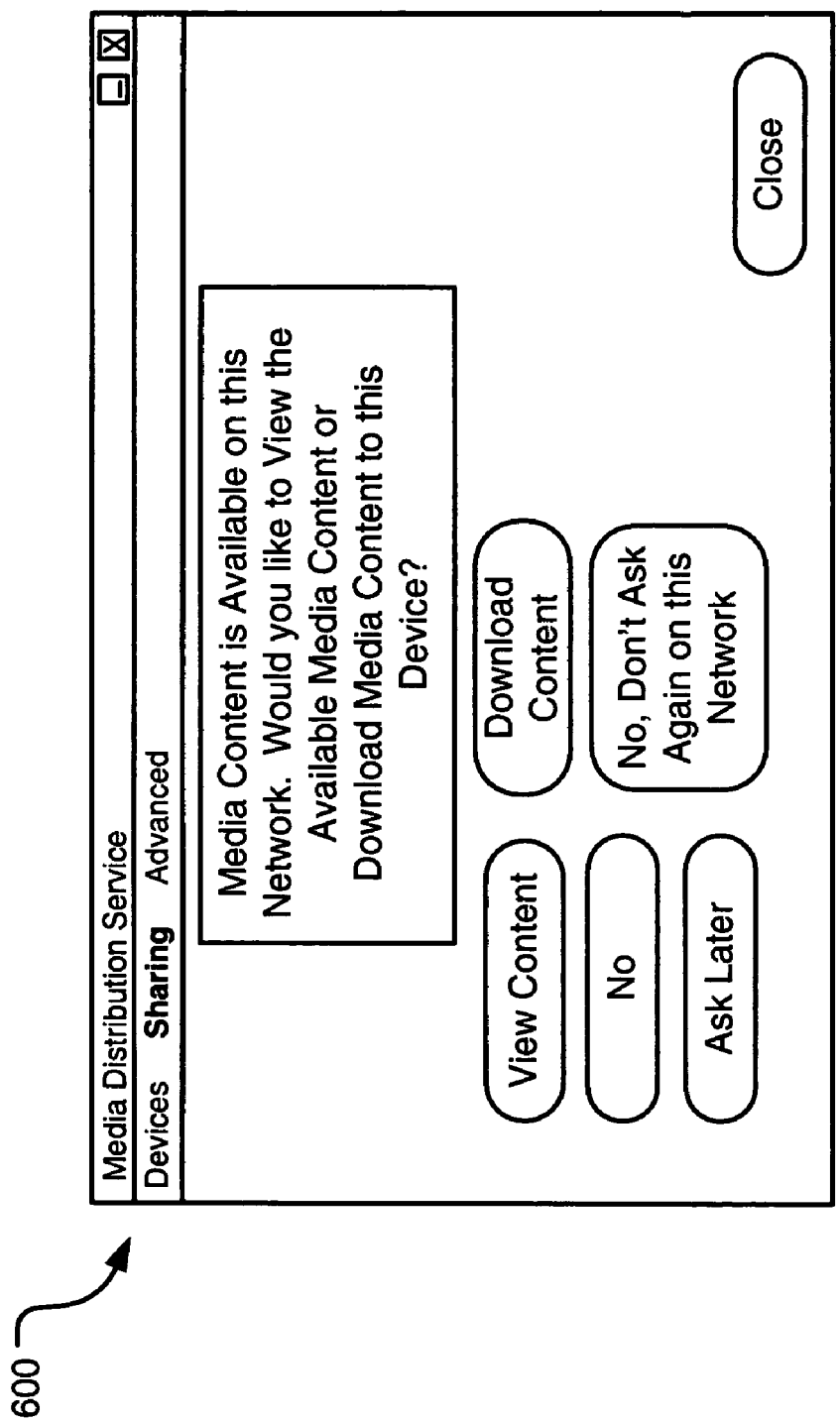
FIGS. 6 through 8 illustrate example user interfaces that may be provided at various times during use of systems and/or methods in accordance with at least some examples of this invention.

At S504, a client device enters the network and/or connects with the sources (assuming that the application program for establishing communications with the source(s) is active and/ or launched at the time of or after client device entry). The client device may communicate with the source(s) in any desired manner, including using UPnP technology, over a wireless connection, via broadcast transmission/reception, infrared transmission/reception, etc. Assuming that media content available for download exists on at least one source, the client device and its user will be advised that media content is available for download through the published information from the source(s) (S506). As a more specific example, when the client device enters the network and receives the metadata published by the source (which may include the actual content, information identifying the content, information indicating that content is available, etc.), the client device may generate a display advising the user that content is available for download. While any type of information can be conveyed to the user and/or the user can be given any desired options for proceeding, an example user interface screen 600 of this type is shown in FIG. 6. As shown, in this example user interface screen 600, the user is advised that media content is available and is asked whether he/she would like to view available media content and/or download the content to the client device. In this example interface 600, in reply the user may: (a) decide to view the available content, (b) begin a download procedure of the available content, (c) decide not to view or download the available content, (d) ask to be prompted again later, (e) advise the system not to ask again about downloading from this network, or (f) close the dialog panel.

Returning to the example procedure shown in FIG. 5, systems and methods according to at least some examples of this invention then may determine how the user responded to the information that media content is available for download. Specifically, at S508, these example systems and methods determine whether the user has attempted to connect with the source and/or network for content downloading purposes (answer "Yes" at S508, e.g., by clicking on the "View Content" or "Download Content" icons in interface 600) or not (answer "No" at S508, e.g., by clicking on one of the other available options in interface 600). If the user does not attempt to connect for downloading purposes (i.e., answer "No" at S508), the systems and methods according to this example can perform other processing, if necessary (S510), and the process can then end (S512, e.g., quit, shut down, wait for additional input, continue other processing, wait for additional new media content, etc.). If the user does attempt to connect to the source and/or network for media content downloading purposes (i.e., answer "Yes" at S508), the systems and methods according to this example of the invention then determine whether this user or client device previously has been authorized to download media content from this source and/or network. More specifically, systems and methods according to this example of the invention determine whether this client device previously has been authenticated for downloading media content from the system (S514). If the user or client device previously has been authorized to download media content from the system (answer "Yes" at S514) (e.g., by previously registering the user or device, by entering password information, etc.), the downloading procedure can continue, as will be explained in more detail below (assuming there has been no intervening change to the user's authorization status). If the user or client device previously has not been authorized to download media content on this system (answer "No" at S514), then an authentication or registration procedure may take place (S516) before copying or downloading will proceed.

Figure 7:
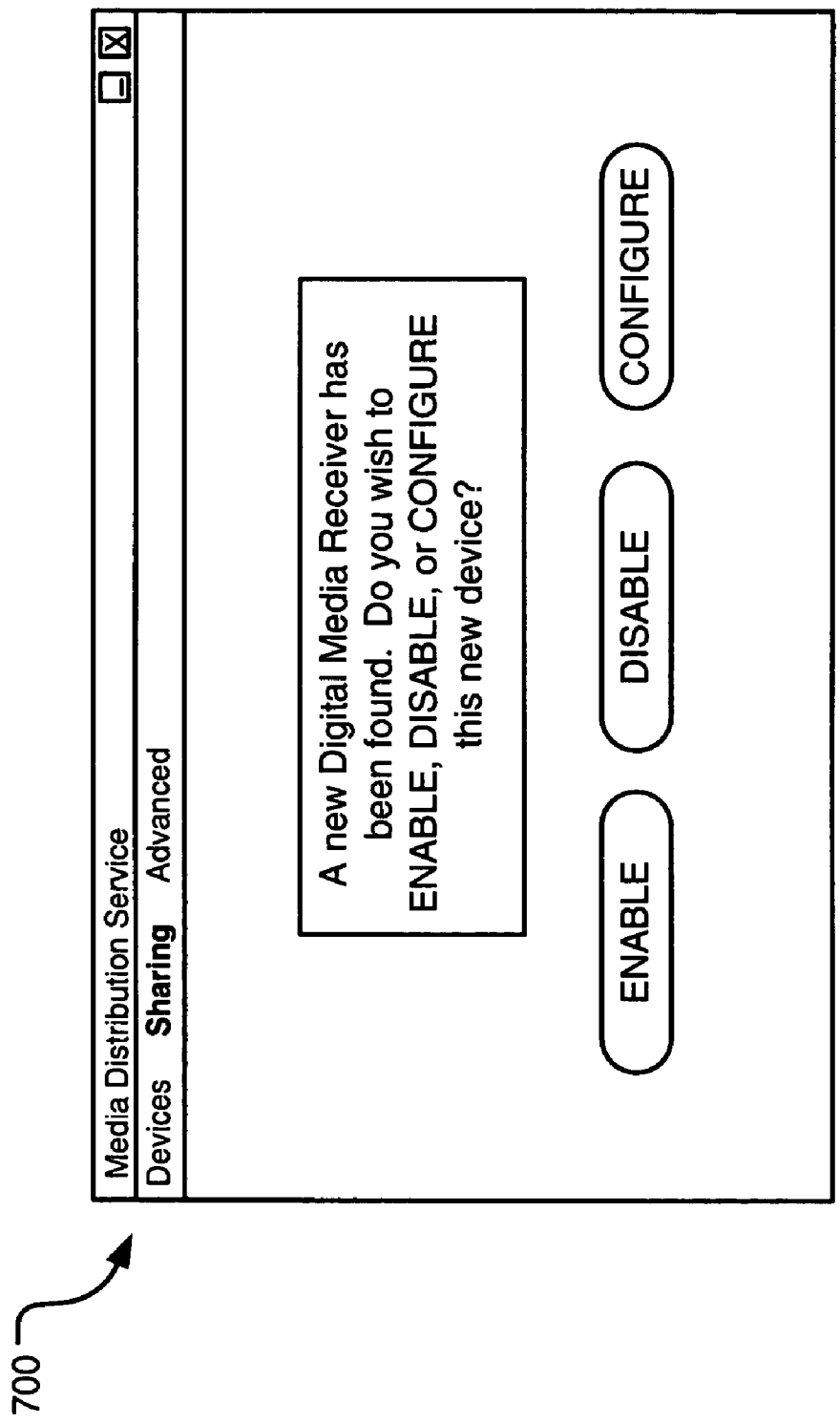

Any type of authentication or registration procedure may be used without departing from the invention, including, for example, user name/password entry, assigning or registering a unique identifier for the device and allowing access to this device in the future, etc. In at least some examples of the invention, authentication or registration may be performed at the media content source or other server computer for the system. FIG. 7 illustrates an example interface screen 700 that may appear at the media content source or other server computer during this initial authentication or registration procedure. Specifically, this interface screen 700 informs the system operator that a user is attempting to receive media content and/or information regarding available media content for potential downloading. The interface screen 700 asks the system operator whether distribution of media content to this client device and/or user should be enabled or disabled. Optionally, if desired, the system operator may use the "configure" option to set various parameters relating to the downloadable media content for this user or client device (e.g., limit downloads to specific types of media content, allow unlimited downloads to any media content, limit downloads to media content owned by certain individuals, limit the number of downloads, etc.). As will be readily recognized by those skilled in the art, the system may be configured so as to limit a specific user's or device's access to media content in any desired manner without departing from this invention.

When downloads are enabled, systems and methods according to at least some examples of the invention may assign or utilize a unique identifier for this client device, such as a hardware MAC address. Thereafter, when this uniquely identified client device later enters the system, it can be quickly authenticated and allowed access to available media content using the unique identifier (optionally, with any restrictions previously imposed during configuration). The same type of unique identifier may be used to quickly determine whether the client device previously has been denied authorization to download media content. Of course, other authentication and checking procedures may be used without departing from the invention.

In at least some examples of the invention, an authentication screen like that shown in FIG. 7 will not appear on the server or source until and unless then client device user attempts to proceed with a download of media content and/or to get access to information regarding available media content. In this way, the client device's entry and exit from the system will be transparent to the source or its operator until the user attempts to interact with the source. Also, in at least some examples of the invention, if desired, the full authentication process need only occur one time per client device. At later times, when the same client device comes into the network, device identification information as described above automatically can be transmitted by the client device and received at the source so that later authorization checks can be performed automatically and quickly, without the need for client device user and/or source operator input or information. Of course, if desired, different types or levels of security or authentication may be imposed such that these automatic authorization checks and/or authentications will not be performed (e.g., authentication at the start of all system interactions with a client device may be required to include user ID and/or password information, account status checks, and/or other authorization or authentication checks may be required each time, if desired). Alternatively, if desired, no authentication needs to be included in systems and methods in accordance with at least some examples of the invention.

Once all desired authorizations and authentications are performed, if any, systems and methods according to this example of the invention provide a list of available media content to the client device (S518), e.g., via the communication systems described above (assuming, of course, that the client device ultimately is authorized to receive media content). The available media content information can be provided in any desired format or manner without departing from the invention. For example, if desired, the client device can separately and independently collect the available media content information from all the authorized sources, and the client device can use this collected information to produce and present a unified single listing of the available media content from the various sources to the client device user (e.g., with the available media content information from all sources grouped and/or sorted in any desired manner). As another alternative, if desired, the available media content may be displayed at the client device sorted in separate lists based on the various different sources. Of course, other ways of sorting may be used without departing from the invention, including, for example, sort by download date, creation date, last edit date, alphabetical by title, air time, etc. As still another example, if desired, one or more of the media content sources may collect the available media content information from all available sources and then publish or transmit the collected data to the client device. Of course, many other ways of making the data available at the client device, sorting it, and presenting it on the client device may be used without departing from this invention.

Once the available media content is displayed to the client device user, the user may select the desired media content he/she would like copied to the client device (S520), and copying of these selected files may begin (S522). The selection and download/copying processes may be initiated at, performed at, and/or driven by the client device in order to pull the information to that device from the sources. In this manner, copying and downloading of media content from multiple sources can conventionally be controlled at a single interface of the client device. Once the desired or selected media content has been copied, systems and methods according to this example of the invention can perform other processing, if necessary (S510), and the process then can end (S512, e.g., quit, shut down, wait for additional input, continue other processing, wait for new media content, etc.).

Of course, many variations in these systems and methods are possible without departing from the invention. For example, with respect to the procedure shown in FIG. 5, various process steps may be omitted, additional steps may be added, the content of specific steps may be changed or changed in order, and/or any combination of these types of changes are possible without departing from the invention. As a more specific example, if desired, the authentication procedures may be performed as soon as the client device enters the system (at S504), if desired. As another example, if desired, prior to copying the selected media content files, systems and methods according to at least some examples of the invention may determine whether a copy of that specific media content file already exists on the client device (and if so, the copy command may be ignored, the user may be prompted to decide whether to overwrite the existing copy, etc.). Many other modifications and changes to the specific procedure, the procedural steps, the content of user interface screens, and/or the like are possible without departing from the invention.

Figure 8:
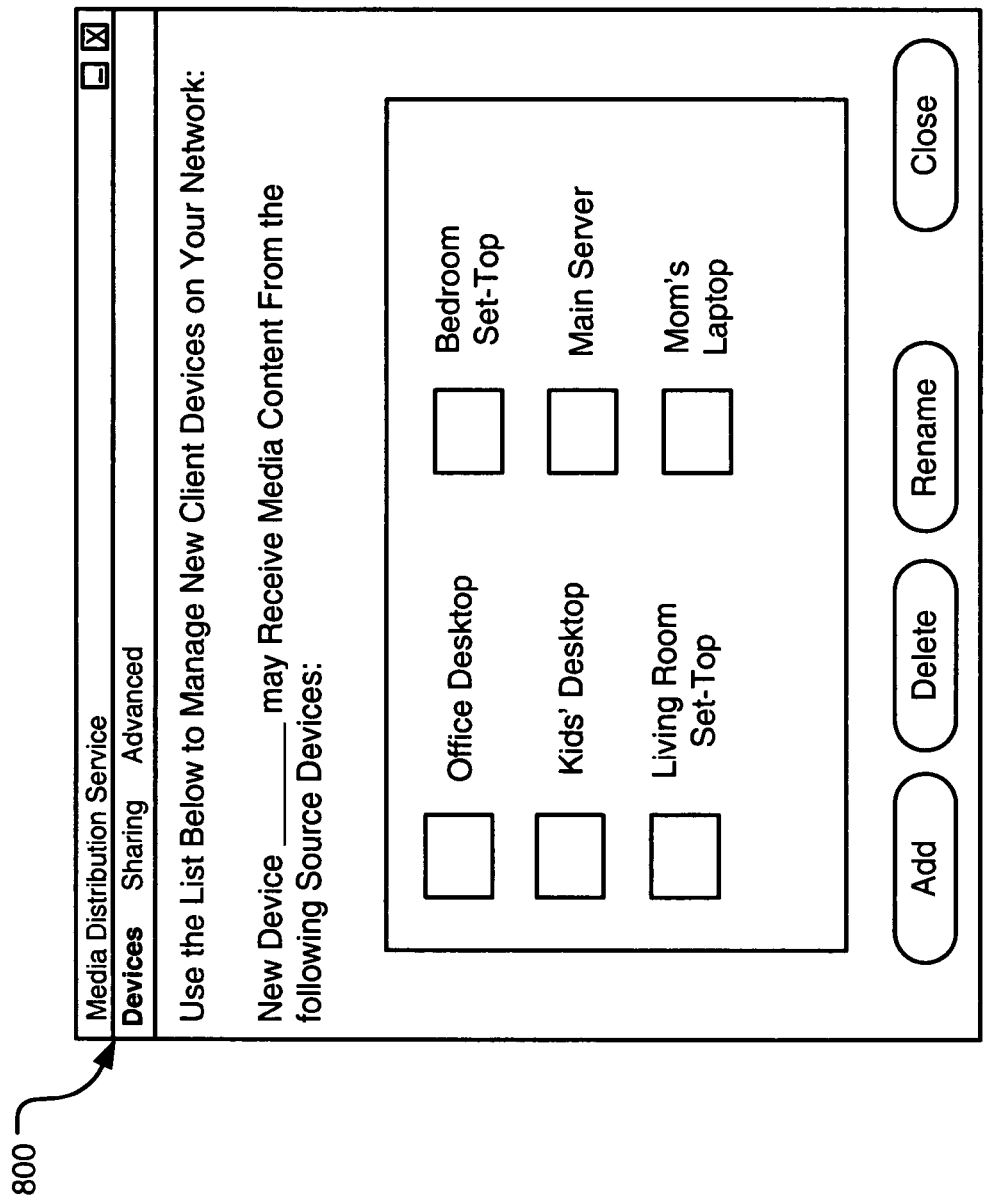
Figure 9:
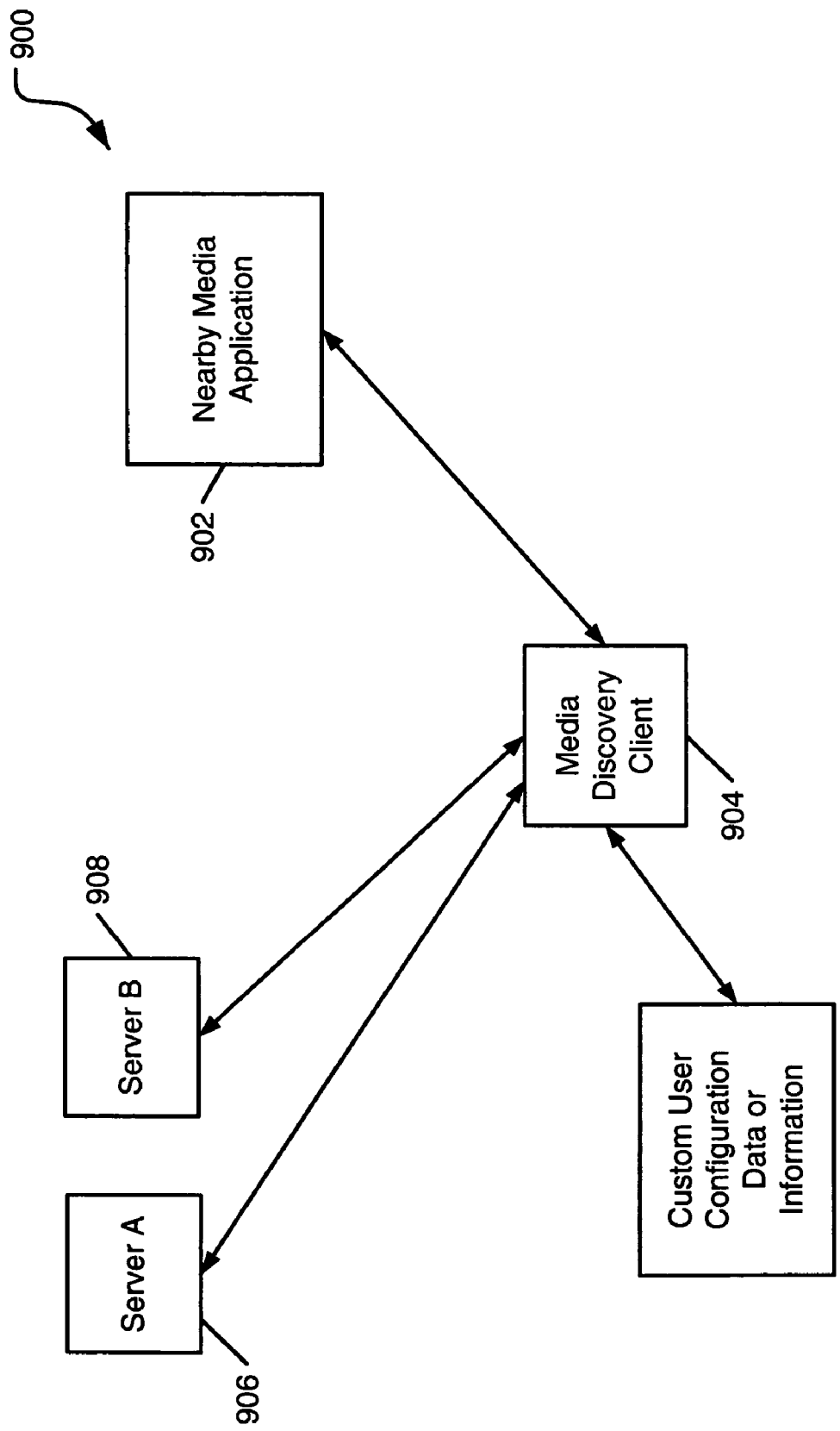
FIG. 9 illustrates example architecture that may be used in systems and/or methods in accordance with at least some examples of this invention.

FIGS. 8 and 9 illustrate additional details of example user interfaces and architecture that may be used in examples of the invention, e.g., for performing various processes or steps described above in conjunction with FIGS. 3-7. FIG. 8 illustrates an example user interface screen 800 for managing or configuring the system, e.g., during an initial set up, at a time when a new client device enters the system and attempts to download data over the network, when a new potential source is added to the network, and/or at any other desired time. When a new client device is authenticated and/or authorized for use in the system to download media content, a configuration screen like that illustrated in FIG. 8 may be used to designate, control, and/or limit the devices from which this newly added device can obtain media content and/or otherwise control or limit information available to this new user. Also, at any time, an interface like that illustrated in FIG. 8 may be used, e.g., by the system operator, to add new media content sources to which specific client devices may gain access, to delete access to specific media content sources to which certain specific client devices may have access, to add new media content sources to the overall systems, to delete existing media content sources from the system, to rename existing media content sources, etc. Other interface screens may be used for these and other configuration purposes, e.g., for "sharing purposes" (for example, to identify, designate, control, and/or limit specific folders or files on a media content source to which any client device can or cannot have access, to place "locks" or passwords on certain folders or files on a media content source, etc.), and the like.

FIG. 9 illustrates more detailed information regarding a specific example of architecture 900 that may be used in various systems and methods described above. As shown in FIG. 9, the architecture includes a "Nearby Media" application program 902 that runs on the client device. This application program operates in conjunction with a "Media Discovery" client 904 also present on the client device. The Media Discovery client 904 in this example structure is an UPnP client that receives all the remote media content information from the different UPnP AV servers (e.g., media content source(s) or servers 906 and 908). All the necessary settings may be configured on the server side in this example, as described above, for example, in conjunction with FIG. 8. In at least some example systems and methods according to this example of the invention, other than registering with the servers 906 and/or 908 as a "client" (or otherwise receiving authorization to gain access to the system), no additional configuration is required at the client device.

Available media content on the network is displayed in the application program 902 through the Media Discovery client 904, and the Media Discovery client 904 communicates with all the UPnP AV servers (such as servers 906 and 908) and retrieves the desired remote media content and/or information relating to this content. The process of discovering nearby media on the server(s) 906 and 908 is initiated, in at least some examples of this invention, as soon as the application program 902 is launched and/or as soon as a client device including an operating application program 902 enters the network with sources 906 and/or 908. In at least some examples of systems and methods according to the invention, the servers 906 and 908 may be configured such that, as long as the application program 902 is active, any changes to the media content on the server end will be communicated to the client 904 in some suitable manner, e.g., by means of notifications, broadcasts, published data, etc. Whenever there is new media content available, the client device may be configured to automatically update the application 902 with the new information. When the application program 902 is exited, the client device may be notified, and it then may stop looking for new media content (or updated media content) from the servers 906 and 908.

The data transferred between the servers 906 and/or 908 and the client device also may include metadata, at least for some types of media content and/or in some systems and methods. In the case where multiple servers are present in the system or network, data from the different servers may be aggregated and presented in a unified fashion on the client device (the client device also may be responsible for collecting the information from the various sources and generating the unified display). Because this aggregation also may result in presentation of duplicate content, in at least some systems and methods according to the invention, checks for duplicates on the various sources (and/or duplications of data already existing on the client device) may be performed, e.g., before the media content actually is transferred from one or more servers to the client device, before the listing is presented to the client device user, and/or at any other desired time.

As an alternative, if desired, media content (e.g., media content with no digital rights management issues) may be streamed from more than one source on the network or plural networks. For example, systems and methods in accordance with these examples of the invention may be arranged to queue up content from more than one UPnP AV server (e.g., queuing at the client device), and the client device can drive the steaming process, from the multiple sources, e.g., as a single playlist. In this manner, a collection of files may be played in a steaming manner, as a single playlist, from multiple sources, in a seamless manner. As an option, copying may be performed in this same manner, to create a single playlist or collection, as opposed to doing so through a steaming operation, as described above.

Figure 10:
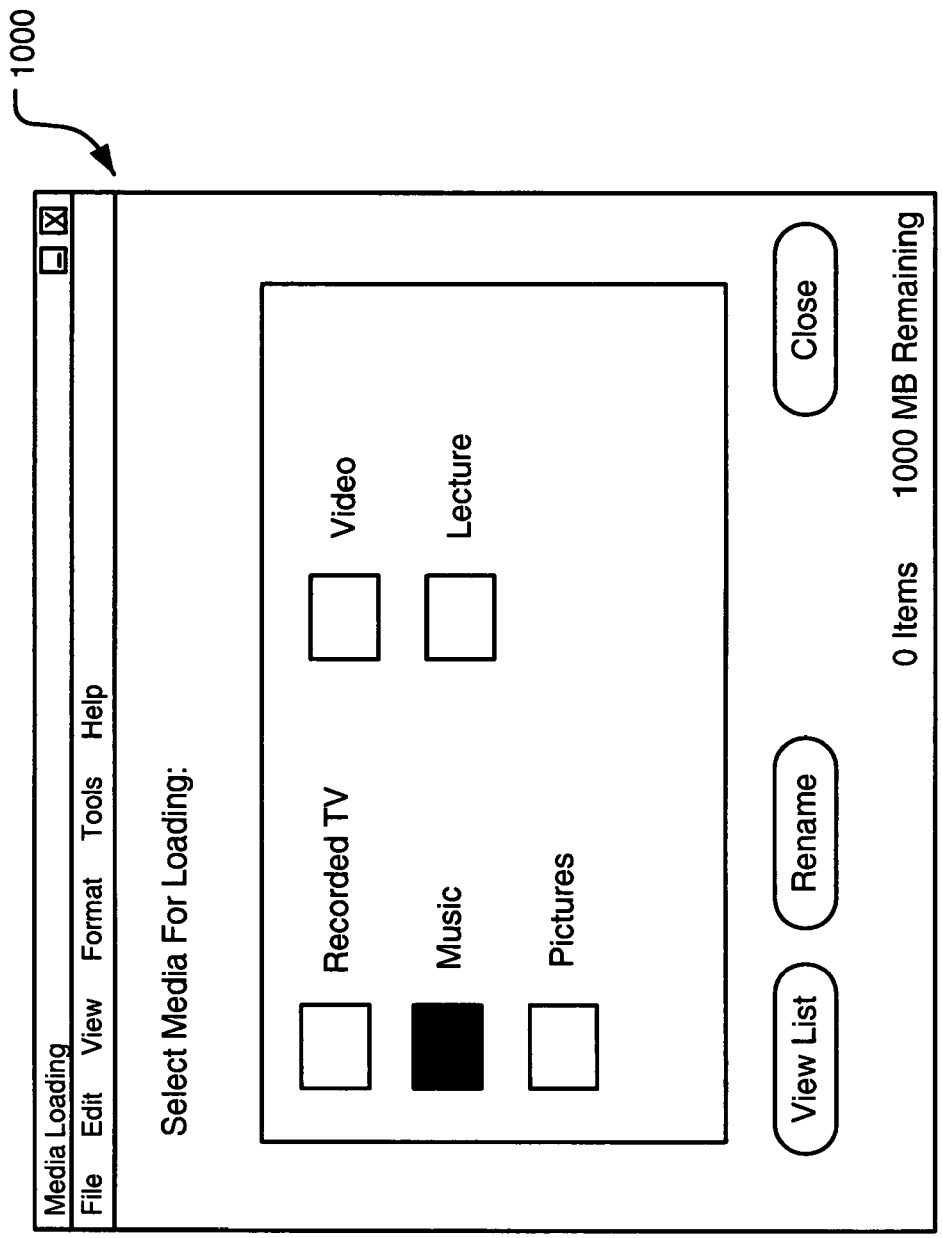
FIGS. 10 through 14 illustrate additional example user interfaces that may be provided at various times during use of systems and/or methods in accordance with at least some examples of this invention.

FIGS. 10-14 illustrate examples of various user interface screens that may be used or provided in systems and methods in accordance with at least some examples of the invention during the processes of downloading available media content information, selecting specific media content, and copying selected media content from the source(s) to the client device. In accordance with at least some examples of this invention, all copied content may be automatically registered on the client device (e.g., in a Windows Media Player library) so as to provide a single launching/management location (e.g., a playlist) on the client device. For example, FIG. 10 illustrates an example user interface screen 1000 that might appear on a client device when available media content viewing and/or downloading procedures begin (e.g., in response to input indicating a "Yes" at S508 in FIG. 5). Because various different types of media content may be available on the various source(s) (e.g., recorded TV data, audio music data, still picture data, video data, lecture data (e.g., from classrooms, from commercial purchase, etc.)), and because of the potentially large overall volume of available media content information available on the various different sources, an initial interface display 1000 may simply allow a user to select a category of media content for downloading. Of course, other general breakdowns or categorization of the available media content (e.g., source-by-source, etc.) may be provided initially without departing from the invention. As still another example, if desired, the available media content information displayed on the client device may be limited to the types of media content that the specific device can play back.

Figure 11:
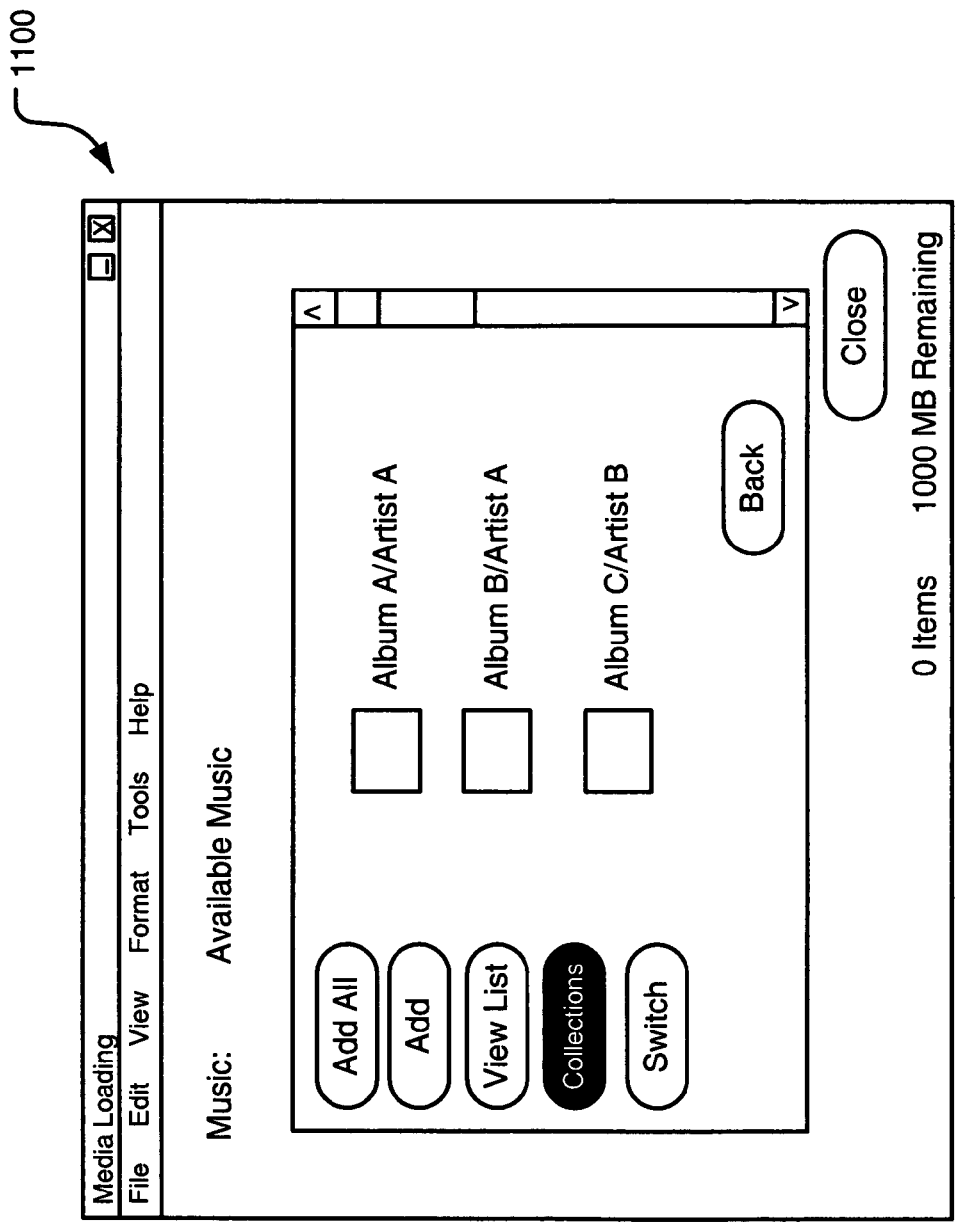

Selecting one or more of the general categories of media content in this example interface display 1000 (e.g., by a pen tap, a mouse button click, keyboard entry, voice input, touch screen input, etc.) may cause another screen to appear, optionally depending on the selection(s) made. FIG. 11 shows an example user interface display 1100 that might appear on a client device display in response to selection of "music" media content in FIG. 10 (as shown by the darkened "Music" icon in FIG. 10). This new interface display 1100 shows available music content sorted or categorized into various different albums. The user can select various content for downloading to the client device, e.g., by clicking on various buttons provided in the interface. If desired, a user could further "drill down" into the album structure (e.g., by clicking on the album name or its icon, etc.), to view a more detailed list associated with the grouping (e.g., individual songs on the album, etc.). Of course, any number of specific albums (or other collections of media content) may be provided in the various screens or listings, from any of the various sources, without departing from the invention.

Figure 12:
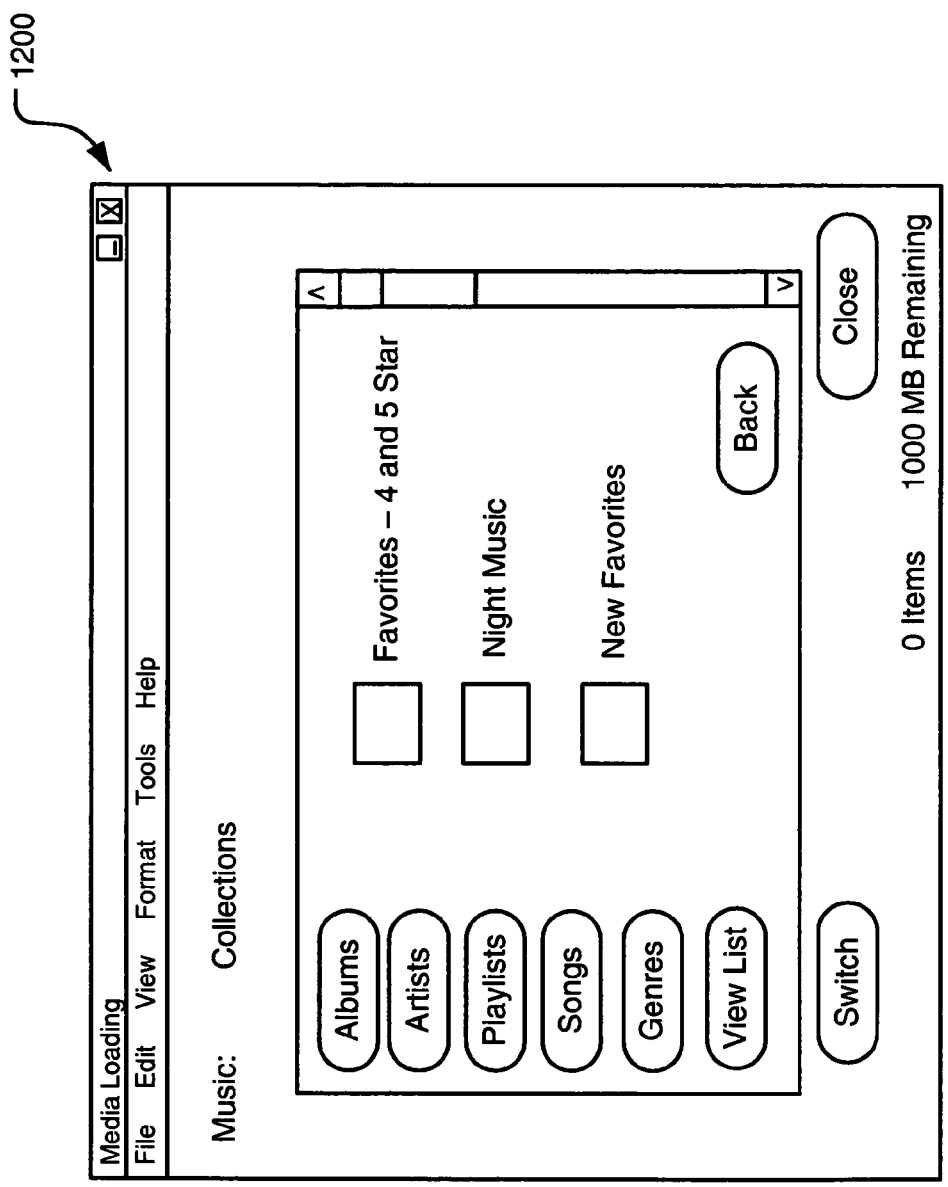

Collections and/or listings of available media content are not limited to those based on predefined information automatically selected by the system (such as download time, download date, last edit time, last edit date, etc.) and/or to those based on commercially provided information (such as album contents, titles, genres, etc.). Rather, if desired, users can make their own collections of media content without departing from this invention. User input producing or generating the collections may be input either on the various source(s) (e.g., as the media content data is originally being collected or at any other desired time), or it may be input at the client device (e.g., as the data is being copied to the client device or at any other desired time). FIG. 12 illustrates an example of a user interface screen 1200 as it might appear on a client device showing potential user defined "collections" that may be provided in systems and methods in accordance with examples of this invention. In this example, the "Collections" screen 1200 of FIG. 12 shows available music content collections defined by a user. This "Collections" screen 1200 may be accessed, for example, by clicking on the "Collections" icon shown in FIG. 11 (as shown by the darkened "Collections" icon in FIG. 11). Of course, any number of specific "Collections" including any combinations of media content information may be generated and provided in the various listings, from any of the various sources, without departing from the invention.

Figure 13:
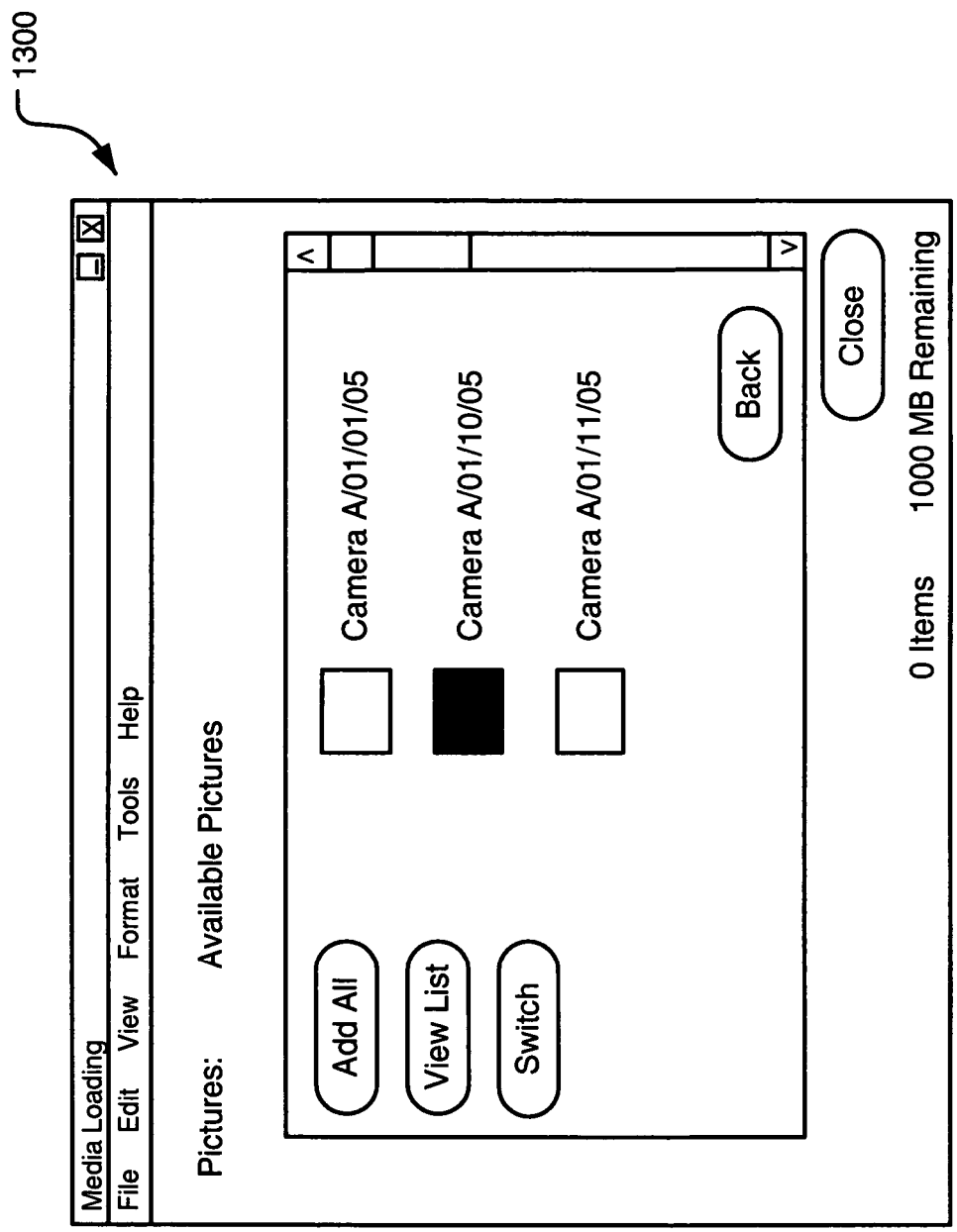
Figure 14:
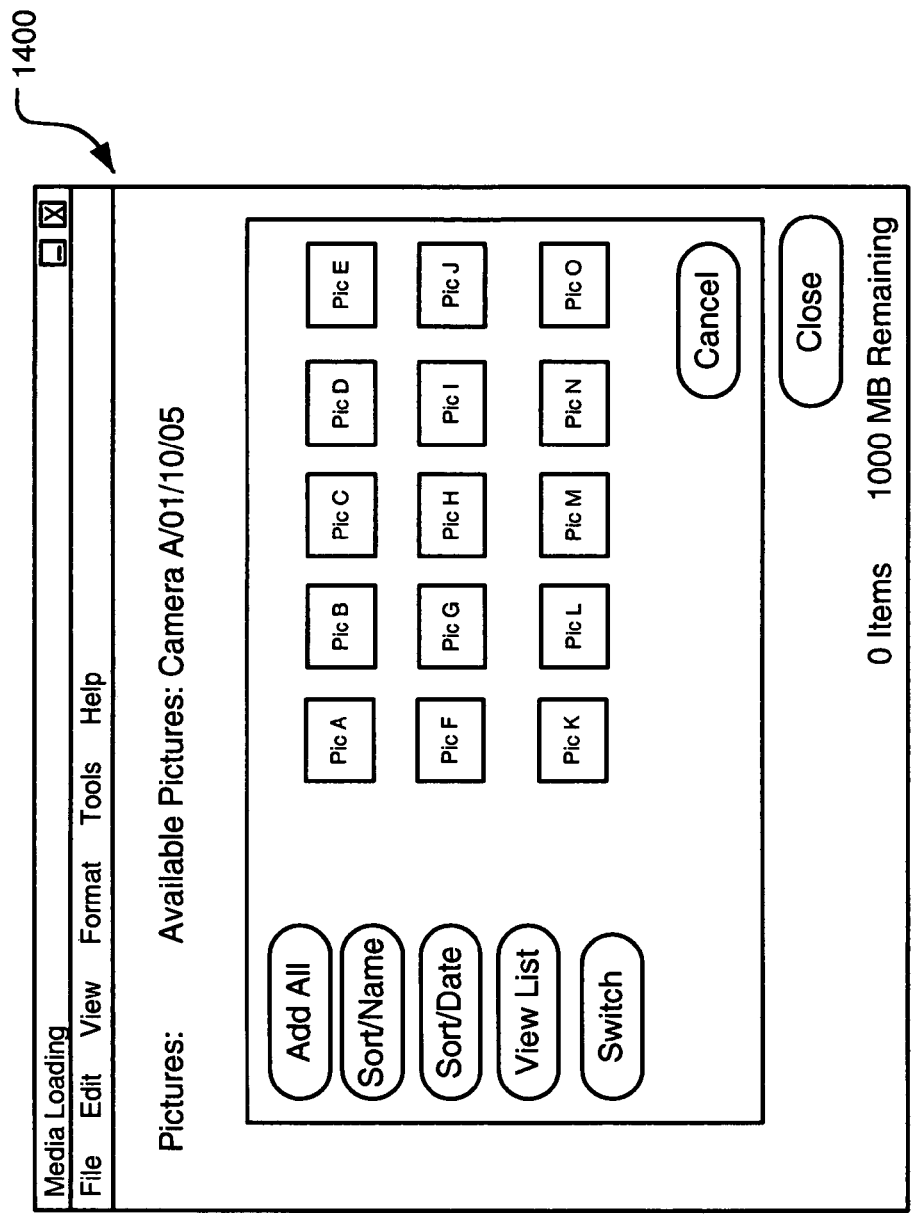

FIGS. 13 and 14 show additional example user interface screens 1300 and 1400 that may be provided on a client device for use with downloading digital picture media content. For example, interface screen 1300 might appear when a user clicks on or drills down using the "Pictures" icon in FIG. 10. In this example interface, the pictures, on an initial sort, are presented based on the camera from which they originated and the picture date (e.g., Camera "A", picture date Jan. 1, 2005). If desired, a user could select all of the pictures on a date for downloading to the client device, or he/she might drill down further, as shown in the user interface screen 1400 of FIG. 14 (e.g., to the date 1/10/05) and choose only specific individual pictures for downloading.

Other specific user interfaces for the various different types of media content and/or mixtures of different types of media content may be provided without departing from the invention. Also, if desired, it is not necessary to sort the media content by media type. Any desired sorting parameters may be used for the listings, presentations, and display interface screens without departing from the invention, including sorts relating to content file creation date, last edit date, source, author name, etc. These parameters may be freely searched, set, and/or changed based on user input, e.g., in manners known in the art. Additionally, if desired, a search engine may be provided to allow users to search, optionally from the client device, to locate specific media or collections of media satisfying various search parameters. Searching mechanisms of this type and interfaces for using them are known and used in the art.

Of course, a wide variety of different types of user interfaces, displayed combinations of information, displayed sorting methods and procedures, and the like, may be used without departing from this invention. Additionally, various ways of navigating between the various user interface screens, including the selection screens, the sorting screens, the list of media content for downloading, and/or other data or information, may be provided without departing from the invention, including navigation tools provided in conventional browser and folder navigation interfaces.

B. Updating and Synchronizing Media Content on a User's Network and/or a Client Device Aspects of the present invention are not limited to "onetime" media content copying scenarios. Rather, in many instances, media content may change or get updated, new content may be added, and the like, both at the client device level and the media content source level. Aspects of this invention may allow the client devices and/or the sources to keep their respective media content up to date by automatically updating and/or synchronizing the content between the client device and the media content source(s).

1. Automatically Storing New Media Content Based on Pre-Defined or User-Selected Input Parameters One way of keeping the media content on a client device up to date for a user involves the automatic download of information from sources to the client device based on predetermined parameters selected and set by the user. For example, a user may use the client device and/or one of the sources to create personalized "queries" or "profiles" that contain various selection criteria (such as all songs from a specific artist, all TV shows with a specific title, all TV shows about a specific topic, all TV shows on a specific channel during a specific time slot, all pictures containing a specific person, etc.). This "profile" information may be stored, e.g., either on the client device or the sources. Then, when the source receives input corresponding to this profile and these pre-defined parameters, the sources would automatically record them, if necessary, and the overall client device/source system may be set up to automatically transfer any media content files meeting the pre-defined parameters to the client device, optionally without any further user initiation or interaction to drive the individual downloading procedures. For example, whenever the client device from which the profile was generated comes on the system and new media content is available on one of the sources that satisfies the pre-defined parameters, the system can operate to transfer this new media content from the source(s) to the client device automatically, without any user interaction or initiation (e.g., in a background thread). Optionally, if desired, the source or other portion of the system can publish or otherwise transmit information to the client device indicating that new media content satisfying the pre-defined parameters for that client device has been received, and this publication, once received, can be used to initiate the automatic copying procedure. As another alternative, each time the client device enters the network, it could perform a search for media content meeting any previously set parameters or profiles, and then automatically begin downloading any discovered media content on the sources meeting the parameters or profiles. From the user's point of view, the media content files meeting the pre-defined parameters or profiles would simply appear on the media content listing of the client device after it was downloaded, without the need for any user action.

If necessary or desired, prior to copying the new media content that satisfies the user input parameters from the source to the client device, systems and methods according to at least some examples of this invention may determine whether this new media content is already included on the client device. This may be accomplished in any desired manner without departing from the invention, for example, by comparing original file creation timestamp data, by comparing content metadata, by comparing titles, by comparing version information, etc. If no duplicate copy is found on the client device, the copying step then may proceed, but if a duplicate (or similar) copy is found on the client device, copying need not proceed (optionally, if desired, the user could be queried to provide input as to which copy should be included on the client device). In some examples, the need to check for duplicate copies may be avoided or reduced, e.g., if the source stores data (e.g., metadata) with newly stored media content, for example, indicating that the media content is new to the source, indicating any previous copying or storing activities associated with the media content file, indicating previous destination client devices to which the file was copied, etc. Even in such situations, however, checking for duplicates may serve some purpose, as the client device may have obtained the new media content from a different, external source.

2. Keeping the Source(s) and the Client Device Synchronized

Systems and methods in accordance with at least some examples of this invention may include the ability to keep the client device media content automatically synchronized with corresponding media content contained on the media content source and vice versa. In accordance with at least some examples of this invention, when the client device connects to the system including the media sources, as described above, the client device will be capable of receiving information indicating the media content included on or available through the various media sources. Then, by comparing the available media content on the sources with the media content already present on the client device, the client device can determine whether the sources contain media content that is not included on the client device. If new media content is present on a source that is not present on the client device, systems and methods according to at least some examples of this invention may copy the newly located media content onto the client device. If desired, in accordance with at least some examples of this invention, the system connection, new media content locating, and/or new media content copying steps mentioned above may be performed automatically by the client device and/or sources, e.g., in a background thread, without user input initiating, launching, or directing the activities. From a user's point of view, the new content simply will appear, automatically, on the client device, without any action on the user's part. As another example, if desired, the user could be advised of the existence of the additional media content and queried as to whether this content should be downloaded to the client device.

The step of determining whether the media sources include media content that is not included on the client device may be performed in any desired manner and at any desired time without departing from this invention. For example, if desired, when new media content is stored on the media content source(s) and/or at other appropriate times, it may be stored with data (e.g., metadata) or updated with new data to indicate that it is new, to indicate that it has or has not been transferred or copied to any client devices, to indicate that it has or has not been transferred or copied to one or more specific client devices (e.g., those registered on the system), with creation date or time stamp information, with most recent edit or download date or time stamp information, or the like. Optionally, if desired, new media content on the sources could be marked with a flag, at least until the next time the client device is registered on the system and given an opportunity to download the new media content from the sources. Other ways of marking the new media content and/or determining whether the sources contain new media content may be used without departing from the invention.

Systems and methods according to at least some example aspects of the invention also may include processing to perform the inverse of the above synchronization procedures. More specifically, in systems and methods in accordance with at least some examples of this invention, when the client device connects to the system including the media sources, as described above, the client device will be capable of receiving information indicating the media content included on or available through the various media sources. Then, by comparing the available media content data on the sources with the media content present on the client device, the client device (or a source) can determine whether the client device contains media content that is not included on at least one of the media content sources (e.g., in some instances, users may download data onto a client device from sources external to the system including the various sources). If new media content is present on the client device that is not present on at least one of the sources, systems and methods according to at least some examples of this invention may copy the newly located media content from the client device onto at least one of the sources. If desired, in accordance with at least some examples of this invention, the system connection, new media content locating, and/or new media content copying steps may be performed automatically by the client device and/or sources, e.g., in a background thread, without user input initiating, launching, or directing the activities. From a user's or system operator's point of view, the new content simply will appear, automatically, on one of the media content computers, without any action on their part. As another example, if desired, the user or system operator could be advised of the existence of the additional media content and queried as to whether this content should be downloaded to the source.

The step of determining whether the client device includes media content that is not included on at least one of the sources may be performed in any desired manner without departing from this invention. For example, if desired, when new media content is stored on the client device and/or at other appropriate times, it may be stored with data (e.g., metadata) or updated with new data to indicate that it is new, to indicate its original source, to indicate that it has or has not been transferred or copied to any network sources, to indicate that it has or has not been transferred or copied to one or more specific sources (e.g., those included on the system), with creation date or time stamp information, with most recent edit or download date or time stamp information, or the like. Optionally, if desired, new media content on the client device could be marked with a flag, at least until the next time the client device is registered on the system and given an opportunity to download the new media content to the sources. Other ways of marking the new media content and/or determining whether the client device contains new media content may be used without departing from the invention.

Maintaining synchronization between the source(s) and the client device is not necessarily limited to keeping each device up to date with respect to completely new media content files present on the other device. Rather, at least some systems and methods in accordance with examples of this invention will synchronize files on these devices to contain the most recent data, e.g., when media content in a media content file on one device is changed (e.g., updated, edited, etc.) as compared to media content in the corresponding media content file on the other device. Systems and methods in accordance with at least some examples of this aspect of the invention may include connecting a client device to a system including at least one media source. In this example, the media source will includes a first media content file and the client device will includes a corresponding first media content file. In at least some examples, the corresponding media file on the client device will have been downloaded from the media source, as described above, such that originally, these two files contained the same media content data. Notably, metadata, header data, or other identifying data relating to these two corresponding files may differ somewhat with respect to one another, e.g., depending on the configuration and protocols for saving and/or copying files, but the underlying media content, at least originally, will have been the same in the corresponding files.

Once the client device re-enters or re-connects with the system including the media source(s), as described above, the client device will be capable of receiving information indicating the media content included on the media source(s). Then, by comparing the available media content data on the source(s) (e.g., the actual media content data or its associated metadata or the like) with the corresponding media content data present on the client device, the client device can determine if the media content of the first media content file on the media source differs from the media content in the corresponding first media content file on the client device (e.g., if updates, edits, changes, etc., had been made in either file). In at least some examples of such systems and methods, when the first media content file differs from the corresponding first media content file in some manner (e.g., in actual underlying media content), a determination then may be made as to which file (i.e., the media content file on the source or the corresponding media content file on the client device) contains the most recent media content. Once the more recent file is determined, the data contained in the first media content file and the corresponding first media content file may be synchronized with one another such that each file includes the most recently loaded media content.

The steps included in determining whether the related media content files on the source and client devices need synchronization and which file contains the more recent data may be performed in any desired manner without departing from this invention. For example, if desired, when a media content file is edited or updated on either the client device or the source, its updated or edited version may be stored along with edit or change identification data (e.g., metadata) to indicate, for example, last edit date, last edit time, recordation date, recordation time, download date, download time, version information, source information, or the like. Then, a simple comparison of the edit or change identification data for each set of the media content files can be used to determine whether the files differ and/or which file of the pair contains the more recent data. Optionally, if desired, edited or changed media content files could be marked or saved on their corresponding device with a flag, at least until the next time the client device is registered on the system and given an opportunity to synchronize with the source(s). Other ways of marking the new media content or determining whether the client device and the source(s) should be synchronized may be used without departing from the invention.

If desired, in accordance with at least some examples of this invention, the system connection, media content file difference determination, and/or synchronization steps described above may be performed automatically by the client device and/or source(s), e.g., in a background thread, without user input initiating, launching, or directing the activities. From a user or system operator point of view, the updated, more recent version of the media content simply will appear on the client device and/or the sources, automatically, without any action on the user's or system operator's part. As another example, if desired, the user or system operator could be advised of the existence of an out-of-date media content file on one of the devices and queried as to whether this content should be updated based on the respective media content file included on the other device.

C. Digital Rights Management Aspects

Due to copyright and/or licensing restrictions, users may have no authorization or restricted authorization to produce and/or use copies of at least some media content. Additional aspects of the present invention relate to digital rights management issues associated with media content that may be present on a source and/or potentially available for copying to a client device.

Systems and methods according to at least some examples of this invention, in at least some instances, first will receive plural media content files on a first media source. The media source (or other system) may determine and/or store information (e.g., as metadata or other data) along with the individual media content files indicating whether digital rights management issues limit a user's ability to receive produce copies of those individual media content files. At some time, a user may enter the system with a client device and seek to download one or more media content files from the source. The user may input data selecting one or more individual media content files for copying to the client device.

For selected media content files that have no copying limitations due to digital rights management issues (such as no copyright limitations, etc.), systems and methods according to examples of this invention simply may proceed with copying the selected media content files to the client device. For selected media content files that have copying limitations due to digital rights management issues, however (e.g., as evidenced by metadata stored along with the file at the source), copying should not take place until the digital rights management issues are resolved and/or until the system determines that the specific copying operation falls within permitted restrictions on copying the content (e.g., until after a license to copy the media content is obtained from the copyright owner, until the system determines that copying limitations in an original license are met, etc.). Accordingly, for at least some of the selected media content files that have copying limitations due to digital rights management issues, prior to copying the file to the client device, systems and methods according to at least some examples of this invention may take at least one step toward obtaining a license to copy the selected media content file or otherwise assuring that the digital rights management issues are resolved.

Various steps may be taken in an effort to obtain a copy license or otherwise resolve the outstanding digital rights management issues without departing from this invention. For example, as a first step, systems and methods in accordance with at least some examples of this invention may advise the client device user of the need to obtain a license, e.g., before the copy is made (and thereby leave the remaining task of obtaining the license, if desired, to the user). As another example, systems and methods in accordance with at least some examples of this invention may proceed with an effort to obtain the necessary license via an on-line Internet or other connection. If the license is successfully obtained, systems and methods according to at least some examples of this invention then may proceed with copying the selected media file or files for which the license was obtained to the client device. If desired, in accordance with at least some examples of this invention, the steps of obtaining the license on-line may begin and proceed automatically, without user input or initiation of the process, such that this effort is transparent to the user (if attempts to obtain the license fail or require user input (e.g., to accept certain terms and conditions of the license), the user then could be advised of the efforts to obtain the license and/or obtain their input).

Some copyright licenses are restrictive on the number of copies present, but do not limit the presence of any individual copy to any particular device. Therefore, in some situations, the steps to resolve the digital rights management issues may include "checking out" the selected media file or files from the first media source and checking these selected media content file or files in to the client device (i.e., copying the files onto the client device). In such arrangements, once checked out, no available copy of these selected media content files will remain on the source while the authorized copy remains with the client device. Therefore, before that same selected file can be copied from the source to another client device, it must be checked out of the client device and checked back in to the source (optionally, if desired, it could be checked out of the client device to another client device and/or to a source other than the one from which it originated). In this manner, only a single copy (or an authorized number of copies) of the selected content file(s) with the copying restrictions remains active and available to users at any given time. Of course, this procedure may be extended to situations where a copyright license allows a pre-determined limited number of copies.

As another example procedure, files having digital rights management limitations, issues, and/or restrictions may be transferred or made available to a client device, but when the client device attempts to access the file (e.g., to playback or display the content), the user then may be advised that a license is needed. At this time, in accordance with at least some example systems and methods, steps may be taken to resolve the digital rights management issues (e.g., obtain the license, have the client device connect to a media source vendor and pay for a license or access to the media content, authorize user account and/or credit card charges, etc.).

Of course, other ways of handling or resolving digital rights management issues may be used without departing from this invention. For example, if desired, the media content files made available for copying to the client device (e.g., those files published and/or identified by the sources to the client device) may be limited to media content files that do not require copying licenses. As another example, the published lists of available media content may be designed so as not to include and/or not to allow selection of media content files having limited or restricted reproduction rights and/or no reproduction rights. Some licenses restrict the number of devices on which the media content may be loaded, and such limitations may be adhered to automatically by systems and methods in accordance with the invention (e.g., by the source keeping track of the number of times a file has been copied and not allowing further copies when a license limit is reached, while all allowed numbers of copies are checked out, etc.). Other licenses may allow for media content to be copied onto other devices, but only for a limited or restricted time period, and such limitations also may be adhered to, automatically, by systems and methods in accordance with the invention (e.g., by not allowing access to a specific media content file on the client device after a certain time period or date, by automatically deleting the media content file from the client device after a certain period or date, etc.). Also, rather than proceeding automatically, the user may be advised of any restrictions regarding specific media content and be required to "accept" these restrictions before the copying operations are completed. The user also may be prompted to make decisions about any restrictions impacting the content, its use, and/or its copying. Alternatively, if desired, the "discovered" lists may automatically filter out restricted content so the user never has to deal with it.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A method, comprising:
publishing data indicating available nearby media content stored in an original format on or accessible via a first nearby media source and a second nearby media source, each nearby media source being located on a local area network;
receiving the data indicating the available nearby media content at a client device located on the local area network;
displaying, on the client device, information identifying at least a portion of the available nearby media content; and
pulling at least some portion of the available nearby media content in the original format to the client device for subsequent playback in the original format.

2. A method according to claim 1, further comprising: publishing data indicating available nearby media content stored on or accessible via a third nearby media source, wherein the receiving step additionally includes receiving the data indicating the available nearby media content from the third nearby media source.

3. A method according to claim 2, wherein the displaying step additionally includes displaying, on the client device, information identifying at least a portion of the available nearby media from the third nearby media source.

4. A method according to claim 3, wherein the pulling step additionally includes pulling at least some portion of the available nearby media content from the third nearby media source to the client device.

5. A method according to claim 1, further comprising: generating a display on the client device indicating that nearby media content is available.

6. A method according to claim 5, further comprising: generating a request, using the client device, indicating a desire to receive information identifying the available nearby media content.

7. A method according to claim 6, further comprising: determining, using at least one of the first nearby media source or the second nearby media source, whether the client device is authorized to receive media content or information identifying the available nearby media content from at least one of the first nearby media source or the second nearby media source.

8. A method according to claim 1, further comprising: determining, using at least one of the first nearby media source or the second nearby media source, whether the client device is authorized to receive media content or information identifying available nearby media content from at least one of the first nearby media source or the second nearby media source.

9. A method according to claim 1, wherein the data indicating the available nearby media content stored on or accessible via the first and second nearby media sources is published via a broadcast protocol.

10. A method according to claim 1, wherein the first nearby media source includes a personal computer and the second nearby media source includes a set-top box.

11. A method according to claim 1, wherein, in the publishing step, the data indicating the available nearby media content stored on or accessible via the first nearby media source is published independent of the data indicating the available nearby media content stored on or accessible via the second media source.

12. A method according to claim 1, further comprising: receiving user input indicating at least a first media content file from the available nearby media content to pull to the client device.

13. A method according to claim 12, further comprising: determining whether the first media content file already exists on the client device.

14. the method of claim 1, wherein puling at least some portion of the available media content to the client device comprises automatically downloading the at least some portion of the available nearby media content to the client device according to selection criteria from a user profile.

15. A system, comprising:
at least a first nearby media source and a second nearby media source, each nearby media source being located on a local area network, wherein at least one of the first and second nearby media sources publishes data indicating available nearby media content located on the local area network and stored in an original format on or accessible via at least one of the first nearby media source and the second nearby media source; and
a client device located on the local area network and in electronic communication with at least one of the first nearby media source and the second nearby media source, wherein the client device includes an input system for receiving the data indicating the available nearby media content at a client device, a display device for displaying information identifying at least a portion of the available nearby media content, and a processor system for pulling at least some portion of the available nearby media content to the client device for subsequent playback in the original format.

16. A system according to claim 15, further comprising: a third nearby media content source that publishes data indicating available nearby media content stored on or accessible via the third nearby media source, and wherein the input system of the client device is in electronic communication with the third nearby media source to receive the data indicating the available nearby media content from the third nearby media source.

17. A system according to claim 16, wherein the display device additionally displays information identifying at least a portion of the available nearby media from the third nearby media source.

18. A system according to claim 17, wherein the pulling step additionally includes pulling at least some portion of the available nearby media content from the third media nearby source to the client device.

19. A system according to claim 15, wherein the display device further generates a display indicating that nearby media content is available from at least one of the first and second nearby media sources.

20. A system according to claim 19, wherein the processor system of the client device further generates data indicating a desire to receive information identifying the available nearby media content.

21. A system according to claim 20, wherein at least one of the first and second nearby media sources determines whether the client device is authorized to receive media content or information identifying the available nearby media content from at least one of the first nearby media source or the second nearby media source.

22. the system of claim 15, wherein the processor system comprises a background thread stored thereon adapted for automatically downloading the at least some portion of the available nearby media content to the client device according to selection criteria from a user profile.

23. A method for maintaining up to date media content on a client device for a user, the method comprising:
creating a personalized profile according to media preferences of the user;
searching for available nearby media content based on the personalized profile from at least one nearby media source located on a local area network;
publishing data indicating available nearby media content stored in an original format on or accessible via the at least one nearby media source located on the local area network;
receiving the data indicating the available nearby media content at the client device, the client device being located on the local area network;
displaying, on the client device, information identifying at least a portion of the available nearby media content;
identifying the at least a portion of the available nearby media content according to the media preferences defined by the personalized profile; and
automatically downloading the at least a portion of the available nearby media content from the at least one nearby media source to the client device without user selection of the at least a portion of the available nearby media content.

* * * * *

UNITED STATES PATENT AND TRADEMARK OFFICE
CERTIFICATE OF CORRECTION

PATENT NO. : 7,607,582 B2  Page 1 of 1
APPLICATION NO. : 11/111964
DATED : October 27, 2009
INVENTOR(S) : Vallabh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Twelfth Day of October, 2010

David J. Kappos
*Director of the United States Patent and Trademark Office*